(12) United States Patent
Scoggins, II et al.

(10) Patent No.: US 8,825,488 B2
(45) Date of Patent: *Sep. 2, 2014

(54) METHOD AND APPARATUS FOR TIME SYNCHRONIZED SCRIPT METADATA

(75) Inventors: Jerry R. Scoggins, II, Flower Mound, TX (US); Walter W. Chang, San Jose, CA (US); David A. Kuspa, San Jose, CA (US); Charles E. Van Winkle, Seattle, WA (US); Simon R. Hayhurst, Palo Alto, CA (US)

(73) Assignee: Adobe Systems Incorporated, San Jose, CA (US)

( * ) Notice: Subject to any disclaimer, the term of this patent is extended or adjusted under 35 U.S.C. 154(b) by 256 days.

This patent is subject to a terminal disclaimer.

(21) Appl. No.: 12/789,720

(22) Filed: May 28, 2010

(65) Prior Publication Data

US 2013/0124212 A1    May 16, 2013

Related U.S. Application Data

(60) Provisional application No. 61/323,121, filed on Apr. 12, 2010.

(51) Int. Cl.
| | |
|---|---|
| *G10L 15/04* | (2013.01) |
| *G10L 15/26* | (2006.01) |
| *G11B 27/28* | (2006.01) |
| *H04N 9/475* | (2006.01) |
| *G11B 27/10* | (2006.01) |
| *H04N 5/445* | (2011.01) |

(52) U.S. Cl.
CPC ............... *H04N 9/475* (2013.01); *G11B 27/28* (2013.01); *G10L 15/26* (2013.01); *G11B 27/105* (2013.01); *H04N 5/445* (2013.01)
USPC ........... 704/270; 704/235; 704/251; 704/253; 704/257

(58) Field of Classification Search
USPC ................. 704/235, 251, 253, 270, 278, 257; 348/468; 725/137
See application file for complete search history.

(56) References Cited

U.S. PATENT DOCUMENTS

| | | |
|---|---|---|
| 5,677,739 A | 10/1997 | Kirkland |
| 5,801,685 A | 9/1998 | Miller et al. |

(Continued)

OTHER PUBLICATIONS

Haubold et al. "Alignment of speech to highly imperfect text transcriptions." Multimedia and Expo, 2007 IEEE International Conference on. IEEE, Jul. 2007, pp. 224-227.*
Moreno et al. "A recursive algorithm for the forced alignment of very long audio segments." International Conference on Spoken Language Processing. vol. 8. 1998, pp. 1-4.*

(Continued)

*Primary Examiner* — James Wozniak
(74) *Attorney, Agent, or Firm* — Wolfe-SBMC

(57) ABSTRACT

A method includes receiving script data including script words for dialogue, receiving audio data corresponding to at least a portion of the dialogue, wherein the audio data includes timecodes associated with dialogue words, generating a sequential alignment of the script words to the dialogue words, matching at least some of the script words to corresponding dialogue words to determine hard alignment points, partitioning the sequential alignment of script words into alignment sub-sets, wherein the bounds of the alignment sub-subsets are defined by adjacent hard-alignment points, and wherein the alignment subsets includes a sub-set of the script words and a corresponding sub-set of dialogue words that occur between the hard-alignment points, determining corresponding timecodes for a sub-set of script words in a sub-subset based on the timecodes associated with the sub-set of dialogue words, and generating time-aligned script data including the sub-set of script words and their corresponding timecodes.

21 Claims, 16 Drawing Sheets

(56) References Cited

U.S. PATENT DOCUMENTS

| | | | |
|---|---|---|---|
| 5,900,908 A | 5/1999 | Kirkland | |
| 6,172,675 B1* | 1/2001 | Ahmad et al. | 715/251 |
| 6,219,642 B1 | 4/2001 | Asghar et al. | |
| 6,336,093 B2* | 1/2002 | Fasciano | 704/278 |
| 6,442,518 B1* | 8/2002 | Van Thong et al. | 704/235 |
| 6,452,960 B1 | 9/2002 | Sato | |
| 6,473,778 B1 | 10/2002 | Gibbon | |
| 6,477,493 B1 | 11/2002 | Brooks et al. | |
| 6,490,553 B2* | 12/2002 | Van Thong et al. | 704/211 |
| 6,728,682 B2* | 4/2004 | Fasciano | 704/278 |
| 6,772,122 B2 | 8/2004 | Jowitt et al. | |
| 6,925,455 B2* | 8/2005 | Gong et al. | 706/45 |
| 6,975,985 B2* | 12/2005 | Kriechbaum et al. | 704/231 |
| 7,123,696 B2 | 10/2006 | Lowe | |
| 7,168,953 B1 | 1/2007 | Poggio et al. | |
| 7,231,351 B1 | 6/2007 | Griggs | |
| 7,240,003 B2* | 7/2007 | Charlesworth et al. | 704/254 |
| 7,260,738 B2 | 8/2007 | Cohen et al. | |
| 7,487,086 B2 | 2/2009 | Griggs | |
| 7,623,755 B2 | 11/2009 | Kuspa | |
| 7,672,830 B2 | 3/2010 | Goutte et al. | |
| 7,836,389 B2 | 11/2010 | Howard et al. | |
| 8,064,752 B1 | 11/2011 | Black | |
| 8,131,545 B1* | 3/2012 | Moreno et al. | 704/235 |
| 8,219,899 B2 | 7/2012 | Basson et al. | |
| 8,249,871 B2 | 8/2012 | Mukerjee | |
| 8,281,231 B2* | 10/2012 | Berry et al. | 715/201 |
| 8,301,451 B2 | 10/2012 | Wouters | |
| 8,447,604 B1 | 5/2013 | Chang | |
| 2001/0047266 A1 | 11/2001 | Fasciano | |
| 2002/0010916 A1 | 1/2002 | Thong et al. | |
| 2002/0013709 A1 | 1/2002 | Ortega et al. | |
| 2004/0001106 A1 | 1/2004 | Deutscher et al. | |
| 2004/0093220 A1* | 5/2004 | Kirby et al. | 704/278 |
| 2004/0128179 A1 | 7/2004 | Mashiko et al. | |
| 2005/0120391 A1* | 6/2005 | Haynie et al. | 725/135 |
| 2005/0228663 A1 | 10/2005 | Boman et al. | |
| 2007/0233738 A1 | 10/2007 | Weinberger et al. | |
| 2008/0114603 A1 | 5/2008 | Desrochers | |
| 2008/0215316 A1 | 9/2008 | Lewis et al. | |
| 2008/0243503 A1 | 10/2008 | Soong et al. | |
| 2008/0252780 A1 | 10/2008 | Polumbus et al. | |
| 2008/0253735 A1 | 10/2008 | Kuspa et al. | |
| 2009/0119101 A1 | 5/2009 | Griggs | |
| 2010/0023964 A1 | 1/2010 | Basso et al. | |
| 2010/0046908 A1 | 2/2010 | Kinaka | |
| 2010/0121936 A1* | 5/2010 | Liu et al. | 709/217 |
| 2010/0141834 A1 | 6/2010 | Cuttner | |
| 2010/0260482 A1 | 10/2010 | Zoor | |
| 2010/0299131 A1 | 11/2010 | Lanham et al. | |
| 2010/0332225 A1 | 12/2010 | Arrowood et al. | |
| 2011/0040559 A1* | 2/2011 | Kim et al. | 704/231 |
| 2011/0055022 A1 | 3/2011 | Mehta et al. | |
| 2011/0134321 A1 | 6/2011 | Berry et al. | |
| 2011/0239107 A1 | 9/2011 | Phillips et al. | |
| 2013/0120654 A1 | 5/2013 | Kuspa | |
| 2013/0124202 A1 | 5/2013 | Chang | |
| 2013/0124203 A1 | 5/2013 | Scoggins, II et al. | |
| 2013/0124213 A1 | 5/2013 | Scoggins, II et al. | |
| 2013/0124984 A1 | 5/2013 | Kuspa | |

OTHER PUBLICATIONS

Placeway et al. "Cheating with imperfect transcripts." Spoken Language, 1996. ICSLP 96. Proceedings., Fourth International Conference on. vol. 4. IEEE, Oct. 1996, pp. 2115-2118.*

U.S. Appl. No. 12/713,008 entitled "Method and Apparatus for Capturing, Analyzing, and Converting Scripts", filed Feb. 25, 2010.

U.S. Appl. No. 12/332,297 entitled "Accessing Media Data Using Metadata Repository", filed Nov. 13, 2009.

U.S. Appl. No. 12/332,309 entitled "Multi-Core Processing for Parallel Speech-To-Text Processing", filed Dec. 10, 2008.

U.S. Appl. No. 12/168,522 entitled "Systems and Methods for Associating Metadata With Media Using Metadata Placeholders", filed Jul. 7, 2008.

U.S. Appl. No. 12/507,746 entitled "Conversion of Relational Databases Into Triplestores", filed Jul. 22, 2009.

U.S. Appl. No. 12/618,353 entitled "Accessing Media Data Using Metadata Repository", filed Nov. 13, 2009.

U.S. Appl. No. 12/789,760, filed May 28, 2010.

U.S. Appl. No. 12/789,749, filed May 28, 2010.

U.S. Appl. No. 12/789,791, filed May 28, 2010.

U.S. Appl. No. 12/789,785, filed May 28, 2010.

U.S. Appl. No. 12/789,708, filed May 28, 2010.

Final Office Action, U.S. Appl. No. 12/789,708, (Oct. 26, 2012), 32 pages.

Final Office Action, U.S. Appl. No. 12/789,785, (Nov. 9, 2012), 15 pages.

Final Office Action, U.S. Appl. No. 12/789,791, (Oct. 30, 2012), 18 pages.

Non-Final Office Action, U.S. Appl. No. 12/789,708, (May 29, 2012), 29 pages.

Non-Final Office Action, U.S. Appl. No. 12/789,749, (Aug. 29, 2012), 14 pages.

Non-Final Office Action, U.S. Appl. No. 12/789,760, (Oct. 26, 2012), 11 pages.

Non-Final Office Action, U.S. Appl. No. 12/789,785, (Jun. 21, 2012), 12 pages.

U.S. Application as Filed, U.S. Appl. No. 12/789,720, (May 28, 2010), 107 pages.

Held, Jim "Timeline Techniques: Adding Clips to a Movie", *Nov. 2006, Peachpit*,(Nov. 2006), 3 pages.

Final Office Action, U.S. Appl. No. 12/789,749, (Mar. 12, 2013), 18 pages.

Notice of Allowance, U.S. Appl. No. 12/789,708, (Mar. 21, 2013), 17 pages.

Final Office Action, U.S. Appl. No. 12/789,760, (Jul. 12, 2013), 18 pages.

Non-Final Office Action, U.S. Appl. No. 12/789,785, Dec. 30, 2013, 15 pages.

Non-Final Office Action, U.S. Appl. No. 12/789,749, Feb. 26, 2014, 20 pages.

"Non-Final Office Action", U.S. Appl. No. 12/789,791, Jul. 1, 2014, 13 pages.

"Non-Final Office Action", U.S. Appl. No. 12/789,760, Jul. 3, 2014, 17 pages.

"Notice of Allowance", U.S. Appl. No. 12/789,785, May 9, 2014, 9 pages.

* cited by examiner

EXT. ENTRANCE TO MOUNTAIN TEMPLE - AFTERNOON

Indy, Henry, Sallah and Brody emerge from the Mountain Temple through the Grecian Facade. From within the Mountain Temple, the ROAR OF WALLS CAVING IN IS HEARD. A cloud of dust and smoke billows out from the entrance.

Henry and Indy mount their horses. Henry turns back to his son.

HENRY
  What did you find, Junior?

INDY
  Junior?! Dad...

SALLAH
  Please... What does it always mean,
  this... this "Junior?"

HENRY
  That's his name. Henry Jones, Junior.

INDY
  I like Indiana.

HENRY
  We named the dog Indiana.

BRODY
  May we go home now, please?

SALLAH
    (to Indy)
  The dog!?
    (laughs)
  You are named after the dog...

INDY
    (embarrassed)
  I've got a lot of fond memories of that dog.

A moment passes as they all ready their mounts and Sallah continues to laugh at Indy.

*FIG. 1B*

| Timecode | Duration | STT Word (best estimate from engine) | | | Comment |
|---|---|---|---|---|---|
| 7165.21 | 0.27 | dad | 0.2577 | 23.7874 2 | |
| 7165.50 | 0.33 | fleas | 0.4506 | 22.3872 0 | Noise/Error |
| 7165.73 | 0.41 | want | 0.2736 | 24.2834 2 | Noise/Error |
| : | : | : | : | : | : |
| 7170.75 | 0.40 | what | 0.2802 | 22.9348 2 | Noise/Error |
| 7171.15 | 0.22 | the | 0.3966 | 22.3493 2 | Noise/Error |
| 7171.37 | 0.44 | doctor | 0.2820 | 22.7451 2 | Noise/Error |
| 7171.81 | 0.11 | the | 0.2919 | 23.4986 2 | Noise/Error |
| 7171.92 | 0.07 | <SIL> | 0.0574 | 22.3580 0 | |
| 7171.99 | 0.31 | dog | 0.1761 | 24.1309 2 | |
| 7172.30 | 2.44 | <s> | 0.1599 | 22.9069 0 | |
| 7174.74 | 0.59 | I | 0.6767 | 22.3309 2 | |
| 7175.33 | 0.07 | <SIL> | 0.1426 | 20.6708 0 | |
| 7175.40 | 0.26 | got | 0.1732 | 23.4571 2 | |
| 7175.66 | 0.06 | a | 0.0183 | 24.4584 3 | |
| 7175.72 | 0.24 | lot | 0.2436 | 24.2517 3 | |
| 7175.96 | 0.09 | of | 0.5493 | 23.6556 3 | |
| 7176.05 | 0.08 | <SIL> | 0.0263 | 23.3611 0 | |
| 7176.13 | 0.30 | fond | 0.3240 | 24.0885 3 | |
| 7176.43 | 0.56 | memories | 0.3621 | 23.3852 3 | |
| 7176.99 | 0.03 | <SIL> | 0.0241 | 21.1695 0 | |
| 7177.02 | 0.10 | of | 0.4699 | 22.0706 2 | |
| 7177.12 | 0.29 | that | 0.5098 | 21.8157 2 | |
| 7177.41 | 0.34 | dog | 0.2472 | 22.9848 2 | |
| 7177.75 | 1.02 | <s> | 0.3976 | 21.2060 0 | |

*FIG. 1C*

|||||*134*|
|---|---|---|---|---|
| 01:58:00:02 | 1:5938 | 1:5939 | Scene | EXT./01:58:00:02 ENTRANCE/01:58:00:02 TO/01:58:00:02 MOUNTAIN/01:58:00:02 TEMPLE/01:58:00:02 -/01:58:00:02 AFTERNOON/01:58:00:02 |
| 01:58:00:04 | 1:5938 | 1:5941 | Actn | Indy,/01:58:00:04 Henry,/01:58:00:05 Sallah/01:58:00:07 and/01:58:00:08 Brody/01:58:00:10 emerge/01:58:00:11 from/01:58:00:13 the/01:58:00:14 Mountain/01:58:00:16 Temple/01:58:00:17 through/01:58:00:19 the/01:58:00:20 Grecian/01:58:00:21 Facade./01:58:00:23 From/01:58:00:24 within/01:58:01:01 the/01:58:01:02 Mountain/01:58:01:04 Temple,/01:58:01:05 the/01:58:01:07 |
| *140* | | *137* | | *136*  *138* |
| 01:59:24:15 | 1:5938 | 1:5983 | Diag | We/01:59:24:15 named/01:59:24:16 the/01:59:24:16 dog/01:59:24:19 Indiana./01:59:24:21 |
| 01:59:24:21 | 1:5938 | 1:5985 | Char | BRODY/01:59:24:21 |
| 01:59:24:23 | 1:5938 | 1:5987 | Diag | May/01:59:24:23 we/01:59:24:25 go/01:59:25:02 home/01:59:25:04 now,/01:59:25:06 please?/01:59:25:08 |
| 01:59:25:08 | 1:5938 | 1:5989 | Char | SALLAH/01:59:25:08 |
| 01:59:25:08 | 1:5938 | 1:5991 | Parn | (to/01:59:25:08 Indy)/01:59:25:08 |
| 01:59:25:10 | 1:5938 | 1:5993 | Diag | The/01:59:25:10 dog!?/01:59:25:19 |
| 01:59:25:19 | 1:5938 | 1:5995 | Parn | (laughs)/01:59:25:19 |
| 01:59:26:03 | 1:5938 | 1:5997 | Diag | You/01:59:26:03 are/01:59:26:13 named/01:59:26:22 after/01:59:27:06 the/01:59:27:15 dog.../01:59:31:25 |
| 01:59:31:25 | 1:5938 | 1:5999 | Char | INDY/01:59:31:25 |
| 01:59:31:25 | 1:5938 | 1:6001 | Parn | (embarrassed)/01:59:31:25 |
| 01:59:33:17 | 1:5938 | 1:6003 | Diag | I've/01:59:33:17 got/01:59:35:10 a/01:59:35:16 lot/01:59:35:18 of/01:59:35:24 fond/01:59:36:03 memories/01:59:36:11 of/01:59:37:01 that/01:59:37:03 dog./01:59:37:10 |

FADE IN:

*904*

EXT. MAROON MOVIE STUDIO - DAY    *906a*

VALIANT emerges from the stage onto a bustling Hollywood studio lot where
Cartoon Characters (TOONS) and humans are comingling as if it were the most
natural thing in the world. Valiant stops by an Acme Novelty truck which is
unloading Toon props. There are bombs, rockets, flattened pocket watches,
anvils, giant slingshots, etc. The license plate is California 1946. He fishes
out a pack of Chesterfields and taps out a half a butt that had been stubbed
out. As he lights it, Valiant regards a chubby, balding man wearing a threepiece
suit and a worried expression coming towards him. He is R.K. MAROON,
studio boss. Maroon is leading an entourage of ASSISTANTS trying to keep up.

MAROON  *908*

Starting tomorrow there'll be no more roast beef  *910*
        lunches. What happened to cheese sandwiches? I
*906b*     was raised on cheese sandwiches.

As the Assistants dutifully record his thoughts, Maroon sees a GUY taking a
nap in the shade of a palm tree.

MAROON
                      (continuing)  *912*
*914*     And tell that guy sleepin' over there he's fired!

SHOT OF A LARGE MAN SLEEPING.

ASSISTANT
        It's your wife's brother, R.K.

MAROON
                      (reconsiders)
*906c*     Oh... tell him he's promoted. But get him out of my sight.

As the Assistants disperse, Maroon approaches Valiant.

MAROON
        Valiant, did you see the rabbit?

VALIANT
        He was blowin' his lines, all right.

*FIG. 9A*

|   | Video Description Track | Main Audio Program Recorded Dialogue |
|---|---|---|
| 1 | 00:00:27:00<br><br>VALIANT emerges from the stage onto a bustling Hollywood studio lot where Cartoon Characters (TOONS) and humans are comingling as if it were the most natural thing in the world. ~~Valiant stops by an Acme Novelty truck which is unloading Toon props. There are bombs, rockets, flattened pocket watches, anvils, giant slingshots, etc. The license plate is California 1946.~~ He fishes out a pack of Chesterfields and taps out a half a butt that had been stubbed out. As he lights it, Valiant regards a chubby, balding man wearing a threepiece suit and a worried expression coming towards him. He is R.K. MAROON, studio boss. Maroon is leading an entourage of ASSISTANTS trying to keep up. | 00:00:28:00 Gap |
| 2 |  | Starting tomorrow there'll be no more roast beef lunches. What happened to cheese sandwiches? I was raised on cheese sandwiches. |
| 3 | ~~As the Assistants dutifully record his thoughts, Maroon sees a GUY taking a nap in the shade of a palm tree.~~ | 00:00:00:12 (No gap available) |
| 4 |  | And tell that guy sleepin' over there he's fired! |
| 5 |  | It's your wife's brother, R.K. |
| 6 |  | Oh... tell him he's promoted. But get him out of my sight. |
| 7 | 00:00:04:00<br><br>As the Assistants disperse, Maroon approaches Valiant. | 00:00:04:06 |
| 8 |  | Valiant, did you see the rabbit? |
| 9 |  | He was blowin' his lines, all right. |

FIG. 9B

METHOD AND APPARATUS FOR TIME SYNCHRONIZED SCRIPT METADATA

This patent application claims priority to U.S. Provisional Patent Application No. 61/323,121 entitled "Method and Apparatus for Time Synchronized Script Metadata" by Jerry R. Scoggins II, et. al, filed Apr. 12, 2010, which is hereby incorporated by reference as though fully set forth herein.

BACKGROUND

In a video production environment, a script serves as a roadmap to when and how elements of a movie/video will be produced. In addition to specifying dialogue to be recorded, scripts are a rich source of additional metadata and include numerous references to characters, people, places, and things. During the production process, directors, editors, sound engineers, set designers, marketing, advertisers, and other production personnel are interested in knowing which people, places, and things occurred or will occur in certain scenes. This information is often present in the script but is not typically directly correlated to the corresponding video content (e.g., video and audio) because timing information is missing from the script. That is, elements of the script are not correlated with a time in which they appear in the corresponding video content. Thus, it may be difficult to link script elements (e.g., spoken dialogue) with the time when they actually occur within the corresponding video. For example, although production personnel may know that a character speaks a certain line of dialogue in a scene based on the script, the production personnel may not be able to readily determine the precise time in the working or final video when the particular line was spoken. A full script can include several thousand script elements or entities. If one were to try to find the actual point in time when a particular event (e.g., when a line was spoken) in a corresponding movie/video, the video content may have to be manually searched by a viewer to locate the event such that the corresponding timecode can be manually recorded. Thus, production personnel may not be able to easily to search or index their scripts and video content.

When a known, written script text is time-matched to raw speech transcript produced from an analysis of recorded dialogue, the script text is said to be "aligned" with the recorded dialogue, and the resulting script may be referred to as an "aligned script." Aligned scripts may be useful as production personnel often desire to search or index video/audio content based on the text provided in the script. Moreover, production personnel may desire to generate closed caption text that is synchronized to actual spoken dialogue in video content. However, due to variations in spoken dialogue versus the corresponding written text, as well as gaps, pauses, sound effects, music, etc. in the recorded dialogue, time aligning is a difficult task to automate. Typically, the task of time-aligning textual scripts and metadata to actual video content is a tedious task that is accomplished by a manual process that can be expensive and time-consuming. For example, a person may have to view and listen to video content and manually transcribe the corresponding audio to generate an index of what took place and when, or to generate closed captioning text that is synchronized to the video. To manually locate and record a timecode for even a small fraction of the dialogue words and script elements within a full-length movie often requires several hours of manual work, and doing this for the entire script might require several days or more. Similar difficulties may be encountered while creating video descriptions for the hearing impaired. For example, a movie may be manually searched to identify gaps in dialogue for the insertion of video description narrations that describe visual elements (e.g., actions, settings) and a more complete description of what is taking place on screen.

Although some automated techniques for time-synchronizing scripts and corresponding video have been implemented, such as using a word alignment matrix (e.g., script words vs. transcript words), they are traditionally slow and error-prone. These techniques often require a great deal of processing and may contain a large number of errors, rendering the output inaccurate. For example, due to noise or other non-dialogue artifacts, in speech-to-text transcripts the wrong time values, off by several minutes or more, are often assigned to script text. As a result, the output may not be reliable, thereby requiring additional time to identify and correct the errors, or causing users to shy away from its use altogether.

Accordingly, it is desirable to provide a technique for providing efficient and accurate time-alignment of a script document and corresponding video content.

SUMMARY

Various embodiments of methods and apparatus for time aligning documents (e.g., scripts) to associated video/audio content (e.g., movies) are described. In some embodiments, provided is a method that includes providing script data that includes ordered script words indicative of dialogue and providing audio data corresponding to at least a portion of the dialogue. The audio data includes timecodes associated with dialogue. The method includes correlating the script data with the audio data, and generating time-aligned script data that includes time-aligned words indicative of dialogue spoken in the audio data and corresponding timecodes for time-aligned words.

In some embodiments, provided is a computer implemented method that includes providing video content data corresponding to the script data including ordered script words indicative of dialogue. The video content data includes audio data includes a transcript including transcript words corresponding to at least a portion of the dialogue and timecodes associated with the transcript words. The method also includes correlating the script data with the video content data, and generating time-aligned script data that includes time-aligned words indicative of words spoken in the video content and corresponding timecodes for time-aligned words.

In some embodiments, provided is a computer implemented method that includes receiving script data including ordered script words indicative of dialogue words to be spoken, receiving audio data corresponding to at least a portion of the dialogue words to be spoken, wherein the audio data includes timecodes associated with dialogue words, generating a sequential alignment of the ordered script words to the dialogue words, matching at least some of the ordered script words to corresponding dialogue words to determine hard alignment points, partitioning the sequential alignment of ordered script words into alignment sub-sets, wherein the bounds of the alignment sub-subsets are defined by adjacent hard-alignment points, and wherein the alignment subsets includes a sub-set of the ordered script words and a corresponding sub-set of dialogue words that occur between the hard-alignment points, determining corresponding timecodes for a sub-set of ordered script words in a sub-subset based on the timecodes associated with the sub-set of dialogue words, and generating time-aligned script data including the sub-set of ordered script words and their corresponding timecodes.

Provided in some embodiments is a non-transitory computer readable storage medium having program instructions stored thereon, wherein the program instructions are executable to cause a computer system to perform a method that includes receiving script data including ordered script words indicative of dialogue words to be spoken, receiving audio data corresponding to at least a portion of the dialogue words to be spoken, wherein the audio data includes timecodes associated with dialogue words, generating a sequential alignment of the ordered script words to the dialogue words, matching at least some of the ordered script words to corresponding dialogue words to determine hard alignment points, partitioning the sequential alignment of ordered script words into alignment sub-sets, wherein the bounds of the alignment sub-subsets are defined by adjacent hard-alignment points, and wherein the alignment subsets includes a sub-set of the ordered script words and a corresponding sub-set of dialogue words that occur between the hard-alignment points, determining corresponding timecodes for a sub-set of ordered script words in a sub-subset based on the timecodes associated with the sub-set of dialogue words, and generating time-aligned script data including the sub-set of ordered script words and their corresponding timecodes.

Provided in some embodiments is a computer system for receiving script data including ordered script words indicative of dialogue words to be spoken, receiving audio data corresponding to at least a portion of the dialogue words to be spoken, wherein the audio data includes timecodes associated with dialogue words, generating a sequential alignment of the ordered script words to the dialogue words, matching at least some of the ordered script words to corresponding dialogue words to determine hard alignment points, partitioning the sequential alignment of ordered script words into alignment sub-sets, wherein the bounds of the alignment sub-subsets are defined by adjacent hard-alignment points, and wherein the alignment subsets includes a sub-set of the ordered script words and a corresponding sub-set of dialogue words that occur between the hard-alignment points, determining corresponding timecodes for a sub-set of ordered script words in a sub-subset based on the timecodes associated with the sub-set of dialogue words, and generating time-aligned script data including the sub-set of ordered script words and their corresponding timecodes.

BRIEF DESCRIPTION OF THE DRAWINGS

FIG. 1B is text that illustrates exemplary script data in accordance with one or more embodiments of the present technique.

FIG. 1C is text that illustrates exemplary transcript data in accordance with one or more embodiments of the present technique.

FIG. 1D is text that illustrates exemplary time-aligned script data in accordance with one or more embodiments of the present technique.

FIG. 9A is a depiction of an exemplary script document in accordance with one or more embodiments of the present technique.

FIG. 9B is a depiction of a portion of an exemplary video description script in accordance with one or more embodiments of the present technique.

Figure 1A:
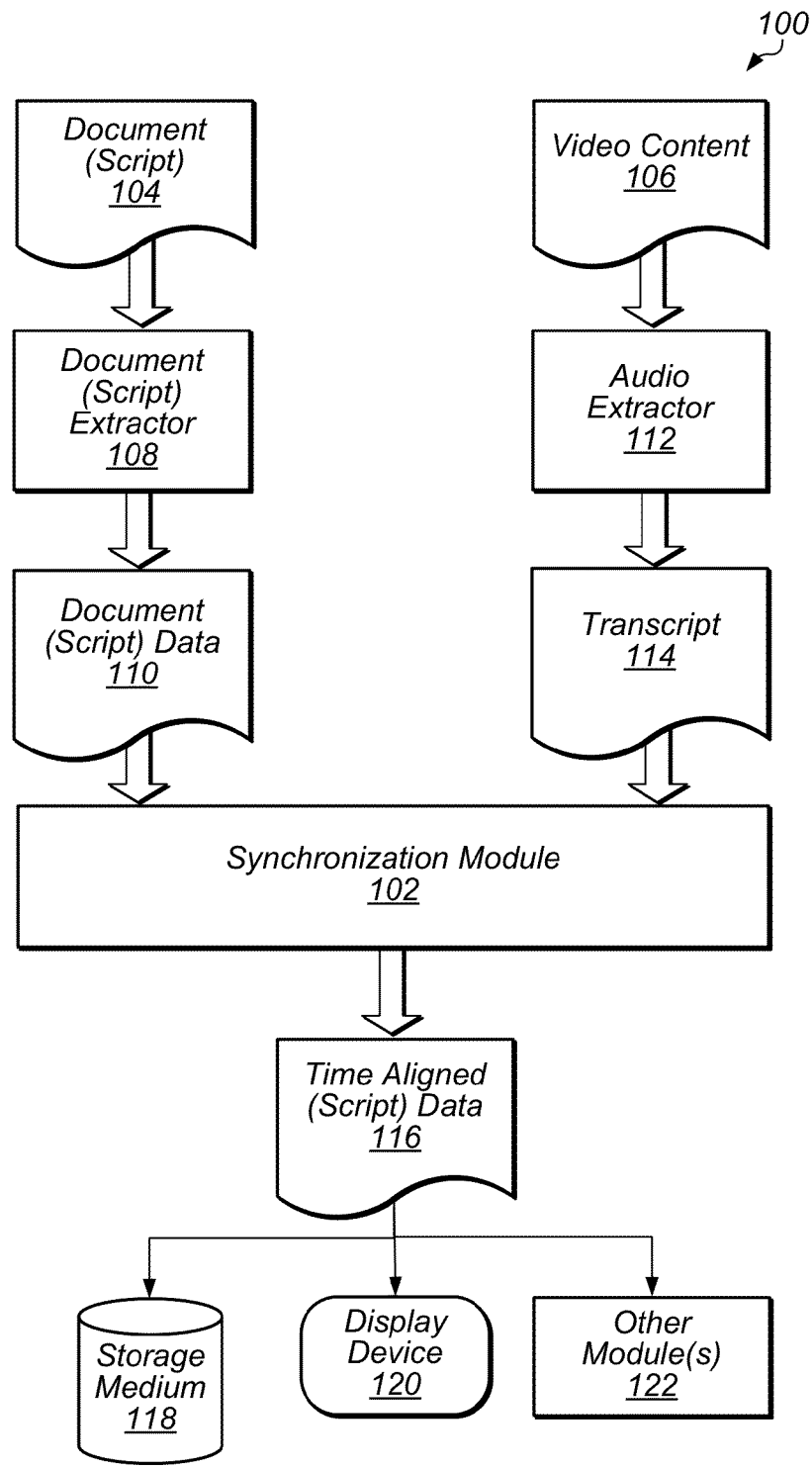
FIG. 1A is a block diagram that illustrates components and dataflow for document time-alignment in accordance with one or more embodiments of the present technique.

While the invention is described herein by way of example for several embodiments and illustrative drawings, those skilled in the art will recognize that the invention is not limited to the embodiments or drawings described. It should be understood, that the drawings and detailed description thereto are not intended to limit the invention to the particular form disclosed, but on the contrary, the intention is to cover all modifications, equivalents and alternatives falling within the spirit and scope of the present invention. The headings used herein are for organizational purposes only and are not meant to be used to limit the scope of the description. As used throughout this application, the word "may" is used in a permissive sense (i.e., meaning having the potential to), rather than the mandatory sense (i.e., meaning must). Similarly, the words "include", "including", and "includes" mean including, but not limited to. As used throughout this application, the singular forms "a", "an" and "the" include plural referents unless the content clearly indicates otherwise. Thus, for example, reference to "an element" includes a combination of two or more elements.

DETAILED DESCRIPTION OF EMBODIMENTS

In the following detailed description, numerous specific details are set forth to provide a thorough understanding of claimed subject matter. However, it will be understood by those skilled in the art that claimed subject matter may be practiced without these specific details. In other instances, methods, apparatuses or systems that would be known by one of ordinary skill have not been described in detail so as not to obscure claimed subject matter.

Speech-To-Text (STT)—a process by which source audio containing dialogue or narrative is automatically transcribed to a textual representation of the dialogue or narrative. The source audio may also contain music, noise, and/or sound effects that generally contribute to lower transcription accuracy.

STT transcript—a document generated by a STT transcription engine containing the transcription of the dialogue or narrative of the audio source. Each word in the transcript may include an associated timecode which indicates precisely when the audio content associated with each word of the dialogue or narrative occurred. Timecodes are typically provided in hours, minutes, seconds and frames.

Script—a document that outlines all of the visual, audio, behavioral, and spoken elements required to tell the story in a corresponding video or movie. Dramatic scripts are often referred to as a "screenplay". Scripts may not include timecode data, such that they may not provide information about when an element of the script actually occurs within corresponding video content (e.g., a script may not provide a relative time within the video content that indicates precisely when the audio content associated with each word of the dialogue or narrative occurred).

Script dialogue/narrative—the script lines to be spoken in a corresponding video or movie. Each script line may include text that includes one or more words.

Script alignment—a process by which a set of words of a dialogue or narrative in a script are matched to corresponding transcribed words of video content. Script alignment may include providing an output that is indicative of a relative time within the video content that words of dialogue or narrative contained in the script are spoken.

Aligned Script—a script that outlines all of the visual, audio, behavioral, and spoken elements required to tell the story in a corresponding video or movie and includes timecode data indicative of when elements of the script actually occur within corresponding video content (e.g., a time aligned script may include a relative time within the video content that indicates precisely when the audio content associated with each word of the dialogue or narrative occurred). Timecodes are typically provided in hours, minutes, seconds and frames. Feature films are typically shot at 24 frames per second, thus twelve frames is about ½ second in duration.

Word n-gram—a consecutive subsequence of N words from a given sequence. For example, (The, rain, in), (rain, in, Spain) and (in, Spain, falls) are valid 3-grams from the sentence, "The rain in Spain falls mainly on the plain."

Alignment matrix—a mathematical structure used to represent how the words from a script source will align with the transcribed words of a transcript (e.g., an STT transcript generated via a speech-to-text (STT) process). For example, a vertical axis of the matrix may be formed of words in a script in the sequence/order in which they occur (e.g., ordered script words), and a horizontal axis of the matrix may be formed of words in the transcript in the sequence/order in which they occur (e.g., ordered transcript words). Each matrix cell at the intersection of a corresponding row/column may indicate the accumulated number of word insert, update or delete operations needed to match the sequence of ordered script words to the sequence of ordered transcript words to the (row, col) entry. A path with the lowest score through the matrix is indicative of the best word alignment.

Natural Language Processing (NLP)—a technique in which natural language text is input and then sentences, part-of-speech, noun and verb phrases, and other semantics are automatically extracted. NLP may be provided as a component in processing unstructured or semi-structured text where a large quantity of rich metadata can be found, (e.g., in spec. movie scripts and dramatic screenplays).

Program—a visual and audio production that is recorded and played back to an audience, such as a movie, television show, documentary, etc.

Dialogue—the words spoken by actors or other on-screen talent during a program.

Video Description (or Audio Description)—an audio track in a program containing descriptions of the setting and action. The video description may be inserted into the natural pauses in dialogue or between critical sound elements. A video description often includes narration to fill in the story gaps for the blind or visually impaired by helping to describe visual elements and provide a more complete description of what's happening (e.g., visually) in the program.

Describer—a person who develops the description to be recorded by the voicer. In some cases, the describer is also the voicer.

Voicer (or Voice Talent)—a person who voices the Video Description.

Secondary Audio Program (SAP)—an auxiliary audio channel for analog television that is broadcast or transmitted both over the air and by cable TV. It is often used for an alternate language or Descriptive Video Service.

Digital Television broadcasting (DTV)—Analog broadcasting ceased in the U.S. in 2009 and was replaced by DTV.

Various embodiments of methods and apparatus for aligning features of a script document with features of corresponding video content are provided. Embodiments described herein facilitate aligning script data to the video content data, and to use the script data to improve the accuracy of corresponding speech transcript (e.g., using the script data in place of the potentially inaccurate SST audio transcript from the video content data). In some embodiments, a document includes at least a portion of a script document, such as a movie or speculative script (e.g., dramatic screenplay), that outlines visual, audio, behavioral, and spoken elements required to tell a story. In certain embodiments, video content includes video and/or audio data that corresponds to at least a portion of the script document. In some embodiments, the audio data of the video content is transcribed into a textual format (e.g., spoken dialogue/narration is translated into words). In certain embodiments, the transcription is provided via a speech-to-text (STT) engine that automatically generates a transcript of words that correspond to the audio data of the video content. In some embodiments, the transcript includes timing information that is indicative of a point in time within the video content that one or more words were actually spoken. In certain embodiments, the words of the transcript ("transcript words") are aligned with corresponding words of the script ("script words"). In some embodiments, aligning the transcript words with corresponding script words includes implementation of various processing techniques, such as matching sequences of words, assessing confidence/probabilities that the words identified are in fact correct, and substitution/replacement of script/transcript word with transcript/script words. In some embodiments, the resulting output includes time-aligned script data. In certain embodiments, the script data includes a time-aligned script document including accurate representation of each of the words actually spoken in the video content, and timing information that is indicative of when the word of the script were actually spoken within the video content (e.g., a timecode associated with each word of dialogue/narration). In some embodiments, time-aligned data may include timecodes for other elements of the script, such as scene headings, action elements, character names, parentheticals, transitions, shot elements, and the like.

In some embodiments, two source inputs are provided: (1) a script (e.g., plain dialogue text or a Hollywood Spec. Script/Dramatic screenplay) and (2) an audio track dialogue (e.g., an audio track dialogue from video content corresponding to the script). In certain embodiments, a coarse-grain alignment of blocks of text is performed by first matching identical or near identical N-gram sequences of words to generate corresponding "hard alignment points". The hard-alignment points may include matches between portions of the script and transcript (e.g., N-gram matches of a sequence of script words with a sequence of transcript words) which are used to partition an initial single alignment matrix (e.g., providing a correspondence of all ordered script words vs. all ordered transcript words) into a number of smaller sub-matrices (e.g., providing a correspondence of script words that occur between the hard alignment points vs. transcript words that occur at or between the hard alignment points). Using an algorithm, such as a standard or optimized Levenshtein word edit distance algorithm, additional words matches—between the words of the script and the transcript—may be indentified as "soft alignment points" within each sub-matrix block of text. The soft alignment points may define multiple non-overlapping interpolation intervals. In some instances, unmatched words may be located between the matched words (e.g., between the hard alignment points and/or the soft alignment points). Knowing the time data (e.g., timecode) information for the matched words, an interpolation (e.g., linear or non-linear interpolation) may be performed to determine timecodes for each of the non-matched words (e.g., words that have not been assigned timecode information) occurring between the matched points. As a result, all words (e.g., matched and unmatched) are provide with corresponding timecode information, and the timecode information may be merged with the words of the script and/or transcript documents to generate a time-aligned script document that includes all of the words spoken and their corresponding timecode information to indicate when each of the words was actually spoken within the video content. Such a technique may benefit from combining the accuracy of the script words and the timecodes of the transcript words.

As described in more detail below, the techniques described herein may provide techniques by which all textual elements (e.g., dialogue/narration) of a script (e.g., a Hollywood movie script or dramatic screenplay script) can be automatically time-aligned to the specific points in time within corresponding video content, to identify when specific dialogue, text, or actions within the script actually occur within the video content. This enables identifying and locating when dialogue and important semantic metadata provided in a script actually occurs within corresponding production video content. In some embodiments, time alignment may be applied to all elements of the script (e.g., scene headings, action elements, etc.) to enable a user to readily identify where various elements, not just dialogue words, occur within the script. In certain embodiments, the timecode information may also be used to identify gaps in dialogue for the insertion of video description content that includes narrations to fill in the story gaps for the blind or visually impaired, thereby helping to describe visual elements and provide a more complete description of what's happening (e.g., visually) in the program The techniques described herein may be employed to automatically and accurately synchronize the written movie script (e.g., which may contain accurate text, but no time information) to a corresponding audio transcript (e.g., which contains accurate time information but may include very noisy or erroneous text). In certain instances, techniques may employ the transcript to identify actual words/phrases spoken that vary from the text of the script. The accuracy of the words in the script or transcript may, thus, be combined with accurate timing information in the transcript to provide an accurate time aligned script. The techniques described herein may demonstrate good tolerance to noisy transcripts or transcripts that have a large number of errors. By partitioning the alignment matrix into many smaller sub-matrices, the techniques described herein may also provide improved performance including increased processing speeds while maintaining significantly higher overall accuracy.

System Components and Dataflow for Implementing Time-Alignment

FIG. 1 is a block diagram that illustrates system components and dataflow of a system for implementing time-alignment (system) 100 in accordance with one or more embodiments of the present technique. In some embodiments, system 100 implements a synchronization module 102 to analyze a document 104 and corresponding video content 106. Based on the analysis, system 100 generates time-aligned data (e.g., time aligned script document) 116 that associates various portions of document 104 with corresponding portions of video content 106. Time aligned data 116 may provide the specific points in time within video content 106 that elements (e.g., specific dialogue, text, or actions) defined in document 104 actually occur.

In the illustrated embodiment, document 104 (e.g., a script) is provided to a document extractor 108. Document extractor 108 may generate a corresponding document data 110, such as a structured/tagged document. A structured/tagged document may include embedded script data that is provided to synchronization module 102 for processing.

In some embodiments, document 104 may include a script document, such as a movie script (e.g., a Hollywood script), a speculative script, a shooting script (e.g., a Hollywood shooting script), a closed caption (SRT) video transcript or the like. For simplicity, document 104 may be referred to as a "script" although it will be appreciated that document 104 may include other forms of documents including dialogue text, as described herein.

A movie script may include a document that outlines all of the visual, audio, behavioral, and spoken elements required to tell a story. A speculative ("spec") script or screenplay may include a preliminary script used in both film and television industries. A spec script for film generally includes an original screenplay and may be a unique plot idea, an adaptation of a book, or a sequel to an existing movie. A "television" spec script is typically written for an existing show using characters and storylines that have already been established. A "pilot" spec script typically includes an original idea for a new show. A television spec script is typically 20-30 pages for a half hour of programming, 40-60 pages for a full hour of programming, or 80-120 pages for two hours of programming. It will be appreciated that once a spec script is purchased, it may undergo a series of complete rewrites or edits before it is put into production. Once in "production", the script may evolve into a "Shooting Script" or "Production Script" having a more complex format. Numerous scripts exist and new scripts are continually created and sold.

Script 104 may include a full script including several thousand script elements or entities, for instance, or a partial script including only a portion of the full script, such as a few lines, a full scene, or several scenes. For example, script 104 may include a portion of a script that corresponds to a clip provided as video content 106. Since film production is a highly collaborative process, the director, cast, editors, and production crew may use various forms of the script to interpret the underlying story during the production process. Further, since numerous individuals are involved in the making of a film, it is generally desirable that a script conform to specific standards and conventions that all involved parties understand (e.g., it will use a specific format w.r.t. layout, margins, notation, and other production conventions). Thus, a script document is intended to structure all of the script elements used in a screenplay into a consistent layout. Scripts generally include script elements embedded in the script document. Script elements often include a title, author name(s), scene headings, action elements, character names, parentheticals, transitions, shot elements, dialogue/narrations, and the like. An exemplary portion of a script segment 130 is depicted in FIG. 1B. Script segment 130 includes a scene heading 130a, action elements 130b, character names 130c, dialogues 130d, and parentheticals 130e.

Document (script) extractor 108 may process script 104 to provide document (script) data 110, such as a structured/tagged script document. Words contained in the document (script) data may be referred to as script words. A structured/tagged (script) document may include a sequential listing of the lines of the document in accordance with their order in script 104, along with a corresponding tag (e.g., tags—"TRAN", "SCEN", "ACTN", "CHAR", "DIAG", "PARN" or the like) identifying a determined element type associated with some, substantially all, or all of each of the lines or groupings of the lines. In some embodiments, a structured/tagged document may include an Extensible Markup Language (XML) format, such as *.ASTX format used by certain products, such as those produced by Adobe Systems, Inc., having headquarters in San Jose, Calif. (hereinafter "Adobe"). In some embodiments, document extractor 108 may obtain script 104 (e.g., a layout preserved version of the document), perform a statistical analysis and/or feature matching of features contained within the document, identify document elements based on the statistical analysis and/or the feature matching, pass the identified document elements through a finite state machine to assess/determine/verify the identified document elements, assess whether or not document elements are incorrectly identified, and, if it is determined that there are incorrectly identified document elements, re-performing at least a portion of the identification steps, or, if it is determined that there are no (or sufficiently few) incorrectly identified document elements, and generate/store/output a structured/tagged (script) document or other forms of document (script) data 110 that is provided to synchronization module 102. In some embodiments, document extractor 108 may employ various techniques for extracting and transcribing audio data, such as those described in U.S. patent application Ser. No. 12/713,008 entitled "METHOD AND APPARATUS FOR CAPTURING, ANALYZING, AND CONVERTING SCRIPTS", filed Feb. 25, 2010, which is hereby incorporated by reference as though fully set forth herein.

In the illustrated embodiment, video content 106 is provided to an audio extractor 112. Audio extractor 112 may generate a corresponding transcript 114. Video content 106 may include video image data and corresponding audio soundtracks that include dialogue (e.g., character's spoken words or narrations), sound effects, music, and the like. Video content 106 for a movie may be produced in segments (e.g., clips) and then assembled together to form the final movie or video product during the editing process. For example, a movie may include several scenes, and each scene may include a sequence of several different shots that typically specify a location and a sequence of actions and dialogue for the characters of the scene. The sequence of shots may include several video clips that are assembled into a scene, and multiple scenes may be combined to form the final movie product. A clip, including video content 106, may be recorded for each shot of a scene, resulting in a large number of clips for the movie. Tools, such as Adobe Premiere Pro by Adobe Systems, Inc., may be used for editing and assembling clips from a collection of shots or video segments. In some embodiments, audio content (e.g., without corresponding video content may be provided). For example, audio content, such as that of a radio show) may be provided to audio extractor 112 in place of or along with content that includes video. Although a number of embodiments described here refer to video content 106 as including both video data and audio data, the techniques described herein may be applied to audio content in a similar manner.

Audio extractor 112 may process video content 106 to generate a corresponding transcript that includes an interpretation of words (e.g., dialogue or narration) spoken in video content 106. Transcript 114 may be provided as a transcribed document or transcribed data that is capable of being provided to other portions of system 100 for subsequent processing. In some embodiments, audio extractor 112 includes a speech-to-text engine that takes an audio segment from video content 106 containing spoken dialogue, and uses speech-to-text (STT) technology to generate a time-code transcript of the dialogue. Thus, transcript 114 may indicate the timecode and duration for each spoken word that is identified by the audio extractor. Words of transcript 114 may be referred to as transcript words.

In some embodiments, speech-to-text (STT) technology may implement a custom language model such as that described herein. In some embodiments, speech-to-text (STT) technology may implement a custom language model and/or an enhanced multicore STT transcription engine such as those described in U.S. patent application Ser. No. 12/332, 297 entitled "ACCESSING MEDIA DATA USING METADATA REPOSITORY", filed Nov. 13, 2009 and/or U.S. patent application Ser. No. 12/332,309 entitled "MULTI-CORE PROCESSING FOR PARALLEL SPEECH-TO-TEXT PROCESSING", filed Dec. 10, 2008, which are hereby incorporated by reference as though fully set forth herein. A transcript 114 generated by audio extractor 112 may include a raw transcript. An exemplary raw transcript (e.g., STT transcript) 132 is depicted in FIG. 1C. Raw transcript 132 includes a sequential listing of identified transcript words having associated time code, duration, STT word estimate and additional comments regarding the transcription. The timecode may indicate at what point in time within the video content the word was spoken (e.g., transcript word "dad" was spoken 7165.21 seconds from the beginning of the associated video content), the duration may indicate the amount of time the word was spoken from start to finish (e.g., it took about 0.27 sec to say the word "dad"), and comments may indicate potential problems (e.g., that noise in the audio data may have generated an error). In some embodiments, the raw transcript information may also include a confidence value that indicates the probability that the interpreted/indicated word is accurate. The raw transcript information may not include additional text features, such as punctuation, capitalization, and the like.

In some embodiments, document extraction and audio extraction may occur in parallel. For example, in the illustrated embodiment, document extractor 108 receives script 104 and generates script data 110 independent of audio extractor 112 receiving video content 106 and generating transcript 114. Accordingly, these two processes may be performed in parallel with one another. In some embodiments, document extraction and audio extraction may occur in series. For example, document extractor 108 may receive document 104 and generate document data 110 prior to audio extractor 112 receiving video content 106 and generating transcript 114, or vice versa.

Synchronization module 102 may generate time-aligned data 116. Time-aligned data 116 may be provided as a document or raw data that is capable of being provided to other portions of system 100 for subsequent processing. Time-aligned data 116 may be based on script information (e.g., document data 110) and video content information (e.g., transcript 114). For example, synchronization module 102 may compare transcript words in transcript 114 to script words in the document (script) data 110 to determine whether or not the transcribed words are accurate. The comparison may use various indicators to assess the accuracy. For example, a plurality of words and phrases with exact matches between transcript 114 and document data 110 may have high probabilities of being correct, and may be referred to as "hard reference points". Words and phrases with partial matches (e.g., single words or only a few matched words) may have a lower probability of being correct, and may be referred to as "soft reference points". Words and phrases that do not appear to have matches may have a low probability of being correct. Words and phrases with a low probability of being correct may be subject to additional amounts of processing. For example, low probability matches may be subject to interpolation based on the hard and soft reference points. Words that are part of hard or soft reference points may be referred to as words having a match, whereas words that are not part of a hard or soft reference point may be referred to as unmatched words or words not having a match. As described in more detail below, the hard-alignment points may be used to partition the document data and the transcript into smaller segments that correspond to one another, and additional processing may be performed on the smaller segments in substantial isolation. Further, as described in more detail below, the timecodes and other information associated with matched words may be used to derive (e.g., interpolate) timecode and other information about the unmatched words.

The results of the comparison may be used to generate time aligned data 116. Time aligned data 116 may include words (e.g., from the script words or transcript words) having a specific timecode associated therewith. In some embodiments, time aligned data 116 may include words from both document data 110 and transcript data 114 used to generate a single script that accurately identifies words actually spoken in video content 106 along with corresponding timecode information for each spoken word of dialogue or other elements. The timecode for each word may be obtained directly from matching words of the transcript, or may generated (e.g., via interpolation). Time aligned data 116 may be stored at a storage medium 118 (e.g., a database), displayed at a display device 120 (e.g., a graphical display viewable by a user), or provided to other modules 122 for processing. An exemplary time-aligned script data/document 134 is depicted in FIG. 1D. As depicted, time-aligned data/document 134 includes spoken words 136 grouped with other spoken words of their respective script elements 137, and provided along with their associated timecodes 138. A start time 140 for each element grouping of lines is also provided. In the depicted time-aligned data/document, each of the script elements (and text of the script elements) is also assigned a corresponding time code.

Figure 2:
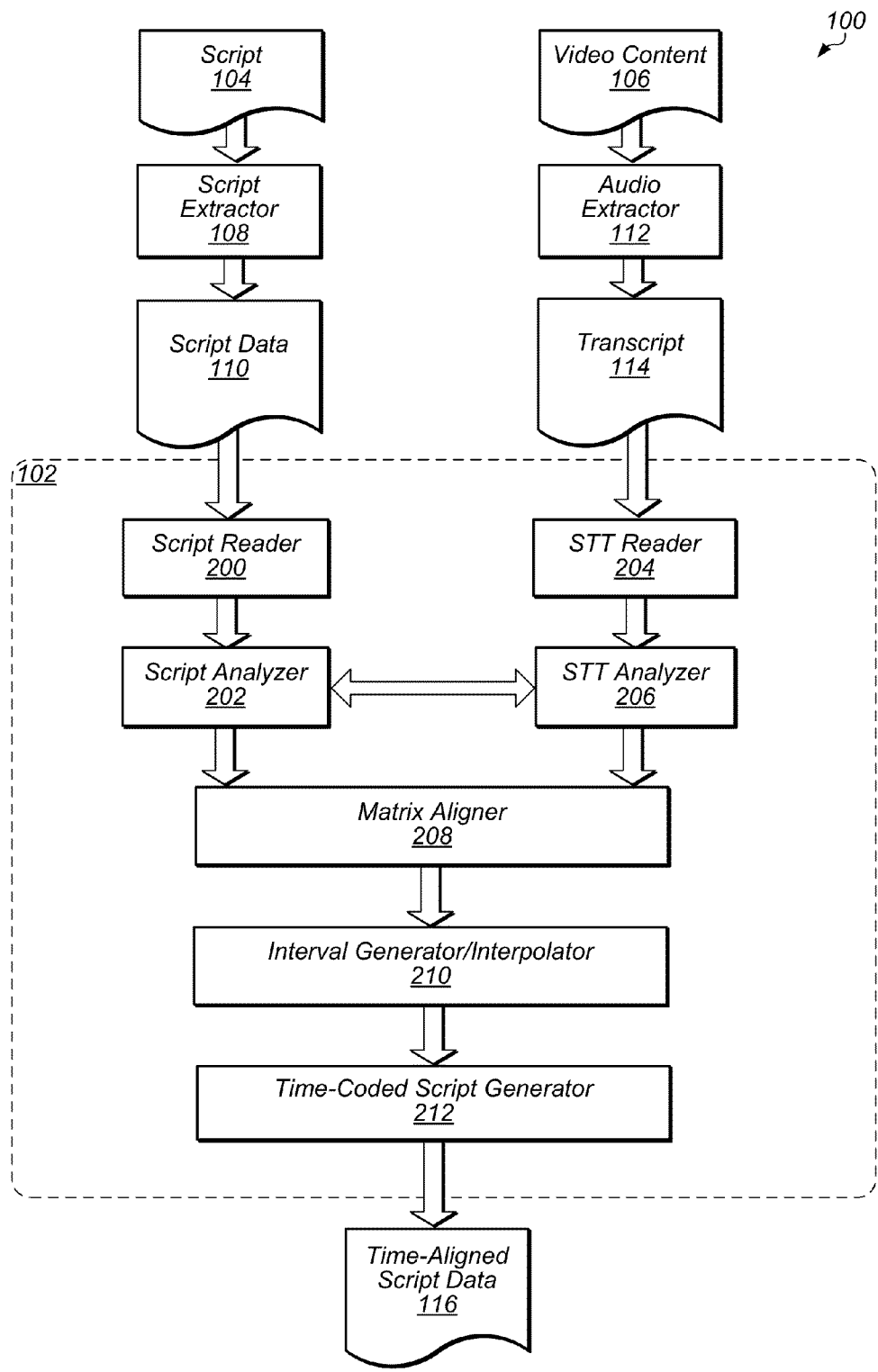
FIG. 2 is a block diagram that illustrates components and dataflow for script time-alignment in accordance with one or more embodiments of the present technique.

FIG. 2 is a block diagram that illustrates components and dataflow of system 100 in accordance with one or more embodiments of the present technique. In the illustrated embodiment, synchronization module 102 includes a script reader 200, a script analyzer 202, a Speech-to-Text (STT) reader 204, an STT analyzer 206, a matrix aligner 208, an interval generator/interpolator 210, and a time-coded script generator 212.

Script Time-Alignment Method

Figure 3:
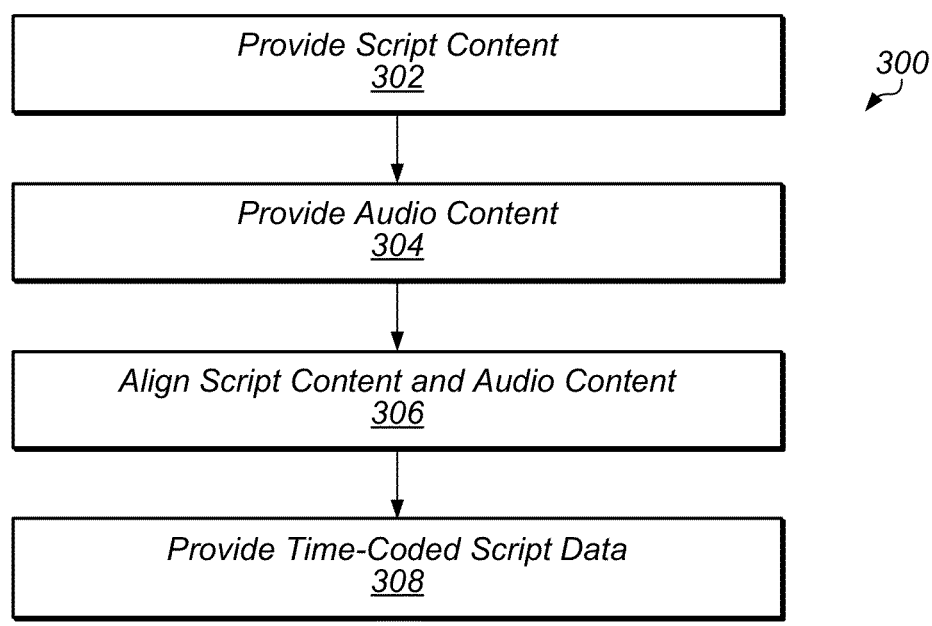
FIG. 3 is a flowchart that illustrates a script time-alignment method in accordance with one or more embodiments of the present technique.

FIG. 3 is a flowchart that illustrates a script time-alignment method 300 according to one or more embodiments of the present technique. Method 300 may provide alignment techniques using components and dataflow implemented at system 100. In the illustrated embodiment, method 300 includes providing script content, as depicted at block 302, providing audio content, as depicted at block 304, aligning the script content and audio content, as depicted at block 306, and providing time-coded script data, as depicted at block 308.

In some embodiments, providing script content (block 302) includes inputting or otherwise providing a script 104, such as a Hollywood Spec. Movie Script or dramatic screenplay script, to system 100. For example, a plain text document, such as a raw script document, may be provided in an electronic format to script extractor 108 which processes script 104 (e.g., to identify, structure, and extract the text of script 104) to generate script data 110, such as a structured/tagged script document. Script extractor 108 may employ techniques for converting documents, such as those described in U.S. patent application Ser. No. 12/332,297 entitled "ACCESSING MEDIA DATA USING METADATA REPOSITORY", filed Nov. 13, 2009, U.S. patent application Ser. No. 12/332,309 entitled "MULTI-CORE PROCESSING FOR PARALLEL SPEECH-TO-TEXT PROCESSING", filed Dec. 10, 2008, and/or U.S. patent application Ser. No. 12/713,008 entitled "METHOD AND APPARATUS FOR CAPTURING, ANALYZING, AND CONVERTING SCRIPTS", filed Feb. 25, 2010, are all hereby incorporated by reference as though fully set forth herein. Document data 110 may be provided to synchronization module 102 for subsequent processing, as described in more detail below.

In some embodiments, providing audio content (block 304) includes inputting or otherwise providing video content 106, such as a clip/shot of a Hollywood movie, having associated audio content that corresponds to a script 104, to system 100. Audio data may be extracted from video content 106 using various techniques. For example, an audio data track may be extracted from video content 106 using a Speech-to-Text (STT) engine and/or a custom language model. In some embodiments, audio extractor 112 may employ an STT engine and/or custom language model to generate transcript 114 that includes a transcription of spoken words (e.g., audio dialogue or narration) of the Hollywood movie or other audio data. Audio extractor 112 may employ various techniques for extracting and transcribing audio data, such as those described below and/or those techniques described in U.S. patent application Ser. No. 12/332,297 entitled "ACCESSING MEDIA DATA USING METADATA REPOSITORY", filed Nov. 13, 2009, and/or U.S. patent application Ser. No. 12/332,309 entitled "MULTI-CORE PROCESSING FOR PARALLEL SPEECH-TO-TEXT PROCESSING", filed Dec. 10, 2008, which are both hereby incorporated by reference as though fully set forth herein. A resulting transcript 114 may be provided to synchronization module 102 for subsequent processing, as described in more detail below.

In some embodiments, aligning the script and audio content (block 306) includes employing a matching technique to align the script words (e.g., dialogue or narrations) of script 104 to elements of the video content 106. This may include aligning script words to corresponding transcript words. In some embodiments, alignment includes synchronization module 102 implementing a two-level word matching system to align script words of script 110 to corresponding transcript words of transcript 114. In some embodiments, a first matching routine is executed to partition a matrix of script words vs. transcript words into a sub-matrix. For example, an N-gram matching scheme may be used to identify high probability matches of a sequence of multiple words. N-gram matching may include attempting to exactly (or at least partially) match phrases of multiple transcript words with script words. The matched sequence of words may be referred to as hard-alignment points. The hard alignment points may include several matched words, and may be used to define boundaries of each sub-matrix. Thus, the hard-alignment points may define smaller matrices of script words vs. transcript words. Each of the smaller sub-matrices may, then, be processed (e.g., in series or parallel) using additional matching techniques to identify word matches within each of the sub-matrices. In some embodiments, processing may be provided via multiple processors. For example, processing in series or parallel may be performed using multiple processors of one or more hosted services or cloud computing environments. In some embodiments, each of the sub-matrix is processed independent of (e.g., in substantial isolation from) processing of the other sub-matrices. These resulting additional word matches may be referred to as soft alignment points. Where unmatched words remain between the hard and/or soft alignment points, the timecode information associated with the words of the hard and soft alignment points may be used to assess timecode information for the unmatched words (e.g., via interpolation). For example, timecodes associated with the words that make up the matched points at the end and beginning of an interval of time may be used as references to interpolate time values for unmatched words that fall within the interval between the matched words. Alignment techniques that may be implemented by synchronization module 102 are discussed in more detail below. Further, techniques for matching are discussed in more detail below with respect to FIGS. 8A and 8B.

In some embodiments, providing time-coded script data includes providing timecodes assigned to all dialogue and other script element types. For example, in some embodiments, after synchronization module 102 aligns word N-grams from script 110 with corresponding word N-grams of transcript 114, it may output (e.g., to a client application) time information in the form of time-coded script data (e.g., time-aligned script data 116) that contains timecodes assigned to some or all dialogue and to some and/or all other script element types associated with script 104. As described above, the data may be stored, displayed/presented or processed. In some embodiments, using the alignment processes described herein, a script (e.g., a Hollywood Spec. script or dramatic screenplay script) and a corresponding STT audio transcript are merged together by aligning script words with transcript words to provide resulting time-aligned script data 116. Time-aligned script data 116 may be processed and used by other applications, such as the Script Align feature of Adobe Premiere Pro. In some embodiments, processing may be implemented to time-align script elements other than audio (e.g., scene headings, action description words, etc.) directly to the video scene or full video content. For example, where a script element, other than dialogue (e.g., a scene heading) occurs between two script words, the timecodes of the script words may be used to determine a timecode of the script element. In some embodiments, each of the script elements may be provided in the time-aligned script data in association with a timecode, as discussed above with regard to FIG. 1D. Providing time-coded script data (block (308)) may include providing the resulting time-aligned data 116 to a storage medium, display device, or other modules for processing, as described above with regard to FIG. 1A.

Figure 4:
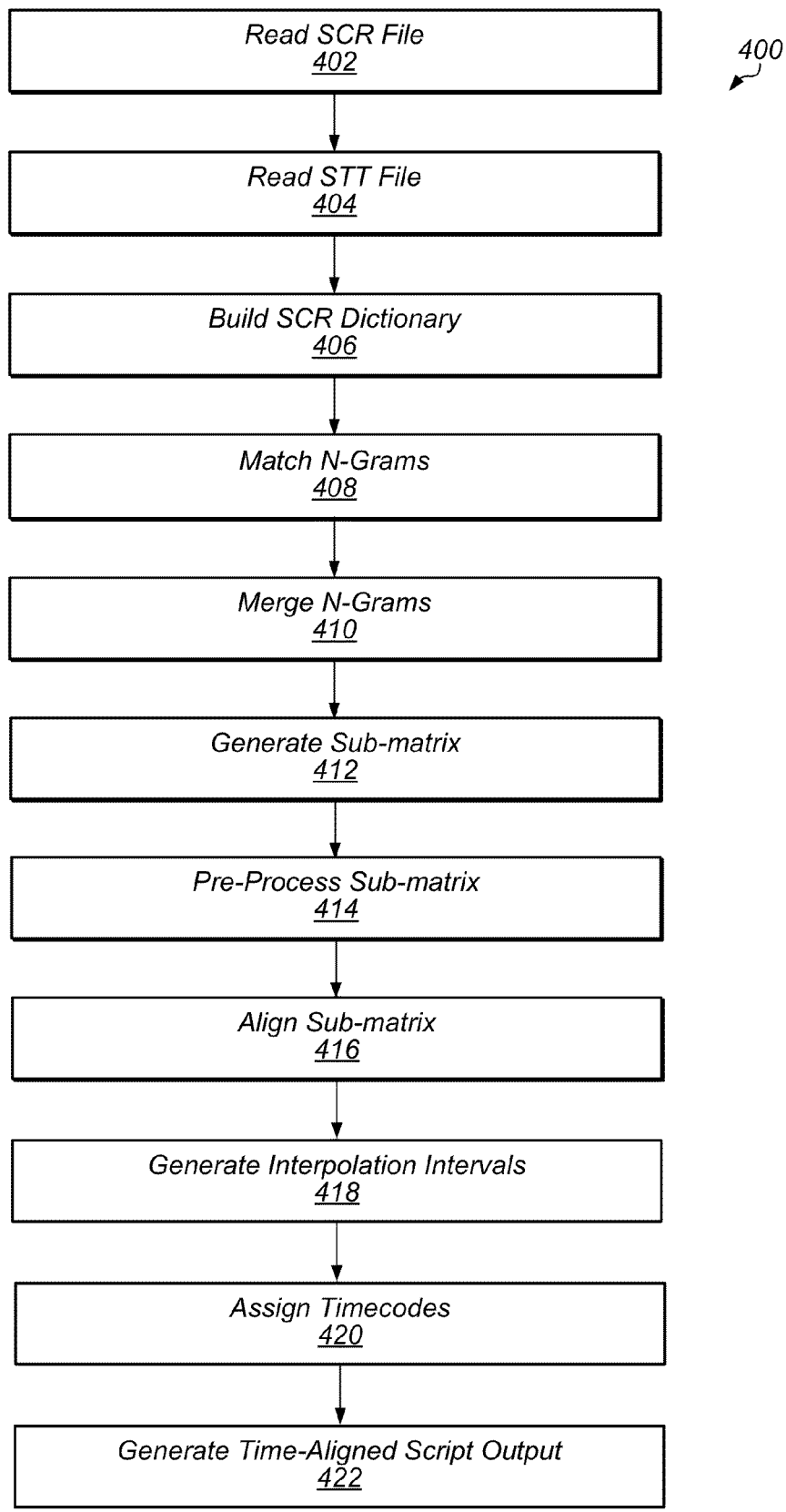
FIG. 4 is a flowchart that illustrates a script synchronization method in accordance with one or more embodiments of the present technique.

FIG. 4 is a flowchart that illustrates a time-alignment method 400 according to one or more embodiments of the present technique. Method 400 may provide alignment techniques using components and dataflow implemented at synchronization module 102. In the illustrated embodiment, method 400 generally includes reading a script (SCR) file and a speech-to-text (STT) file, and processing the SCR and STT files using various techniques to generate an output that includes time-aligned script data.

In the illustrated embodiment, method 400 includes reading an SCR file, as depicted at block 402. This may include reading script data, such as script data 110, described above with respect to block 302. For example, reading an SCR file may include script reader 200 reading a generated SCR file (e.g., document data 110). The SCR file may include a record-format representation of a source Hollywood spec. script of dramatic screenplay script. Records contained in the SCR file may each include one complete script element. Script reader 200 may extract script element type and data values from each record and place these into an internal representation (e.g., a structured/tagged script document).

In the illustrated embodiment, method 400 includes reading an STT file, as depicted at block 404. This may include reading STT data, such as transcript 114, as described above with respect to block 304. Transcript 114 may include an STT file having transcribed data, such as that of the STT word transcript data 132 depicted in FIG. 1C. The STT data may provide a timecode for each spoken word in the audio sound track which corresponds in time to video content 106.

In the illustrated embodiment, method 400 includes building a SCR N-gram dictionary, as depicted at block 406. In some embodiments, building an SCR N-gram dictionary includes identifying all possible sequences of a given number of consecutive words. The number of words in the sequence may be represented by a number "N". For example, the sentence, "The rain in Spain falls mainly on the plain" may be used to generate the following N-gram word sequences, where N is set to a value of 3: (The, rain, in), (rain, in, Spain), (in, Spain, falls), (Spain, falls, mainly), (falls, mainly, on), (mainly, on, the), and (on, the, plain). Note that additional N-gram word sequences may be generated based on words that precede or follow a phrase. For example, where the first word of a following sentence is "Why", an additional 3-gram may include (the, plain, why). In some embodiments, the value of N may be set by a user. In some embodiments, the value of N is set to a predetermined value, such as four. For example, N may be automatically set to a default value of four, and the user may have the option to change the value of N to something other than four (e.g., one, two, three, five, etc.).

In some embodiments, some or all of the possible sequences of N number of consecutive words are identified for the script and/or the transcript, and the respective sequences are stored for use in processing. For example, script analyzer 202 may build a word N-gram "dictionary" of all words from script 110 and may record their relative positions within script 110 and/or STT analyzer 206 may build a word N-gram "dictionary" of all words from transcript 114 and may record their relative positions within transcript 114. The resulting N-gram dictionaries may include an ordered table of 1-gram, 2-gram, 3-gram, or N-gram word sequences.

In the illustrated embodiment, method 400 includes matching N-grams, as depicted at block 408. In some embodiments, matching N-grams may include attempting to match N-grams of the script 110 to corresponding N-grams of transcript 114. For example, SCR analyzer 202 and/or STT analyzer 206 may attempt to match all word N-grams of the N-gram dictionaries and may store the matches (e.g., in an internal table) in association with corresponding timecode information associated with the respective transcript word(s). The stored matching N-grams may indicate the potential for a matched sequence of words, and may be referred to as "candidate" N-grams for merging. For example, a phrase from the script N-gram dictionary may be matched with a corresponding phrase the transcript N-gram dictionary, however, due to the phrase being repeated several time within the script/video content, the match may not be accepted until the relative positions can be verified.

In the illustrated embodiment, method 400 includes merging N-grams, as depicted at block 410. In some embodiments, merging of N-grams may be provided by SCR analyzer 202 and/or STT analyzer 206. In some embodiments, merging N-grams includes merge some or all sequential N-gram matches into longer matched N-grams. For example, where two consecutive matching N-grams are identified, such as two consecutive 3-grams of (The, rain, in) and (rain in Spain), they may be merged together to form a single N-gram, referred to as a single 4-gram of (The, rain, in, Spain). Such a technique may result in merged N-grams of length N+1 after each iteration. The technique may be repeated (e.g., iteratively) to merge all consecutive N-grams to provide N-grams having higher values of N. N-grams with higher values of N may have higher probabilities of being an accurate match. The iterative process may continue until no additional N-gram matches are identified. For example, where there are at most ten consecutive words identified as matching, increasing to an 11-gram length may yield no matching results, thereby terminating the merging process. Further, techniques for N-gram matching are discussed in more detail below with respect to FIGS. 8A and 8B.

With merging complete, the resulting set of merged N-grams may provide a set of "hard alignment points". For example, each separate N-gram may indicate with relatively high certainty that a sequence of words in script 110 precisely matches a sequence of words in transcript 114. The sequence of words may identify a hard-alignment point. Thus, a hard alignment point may include a series of matched words. In some case, the hard alignment points may include a series of words that each soft-align.

Due to the high probability of hard alignment points including accurate matches of words within script 110 and words within transcript 114, the timing data for each of the words of the matching N-grams (e.g., the corresponding timecode for transcript words) may be correlated with the corresponding script words. As discussed in more detail below, timing data for other words (e.g., unmatched words or words having low probabilities of accurate matches) may be assessed and determined based on the timecode data of words associated with matched words (e.g., words that make up one or at least a portion of one or more alignment points). For example, interpolation may be used to assess and determine the position of a script word that occurs between matched script words (e.g., script words associated with alignment points).

Hard alignment points may be found every 30-60 seconds within video content. In some embodiments, if hard alignment points are not found with N=4 (e.g., there are no matches of four consecutive words between the script and the transcript), N is decremented and the process repeated (e.g., returning to block 408). When N=1, words are matched one-to-one. In some embodiments, a default value of N=4 may be used, although the value of N may be modified.

In the illustrated embodiment, method 400 includes generating a sub-matrix, as depicted at block 412. As noted above each hard alignment point may define a block of script text (e.g. a sequence of words in script 110) and a timecode indicative of where the hard alignment point occurs in the video. Although script and transcript words associated with hard alignment points may be associated with timecode data, other script words (e.g., unmatched words between each hard alignment point) may still need to be aligned to corresponding transcript words to assess and determine their respective timecode. In some embodiments, each successive pair of hard/soft alignment points is used to create an alignment sub-matrix. The alignment sub-matrix may include script words (e.g., sub-set of script words) that occur between matched script words (e.g., script words associated with hard alignment points) and intermediate transcript words (e.g., a sub-set of transcript words) that occur between matched transcript words (e.g., transcript words associated with hard alignment points). The script words may be provided along one axis (e.g., the y or x-axis) of the sub-matrix, and the intermediate transcript words may be provided along the other axis (e.g., the x or y-axis) of the sub-matrix.

Figure 5B:
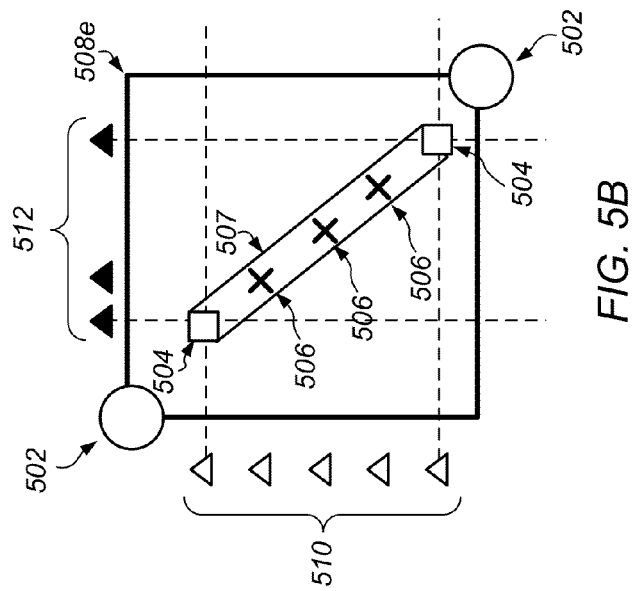
FIG. 5B is a depiction of an exemplary alignment sub-matrix in accordance with one or more embodiments of the present technique.
Figure 5A:
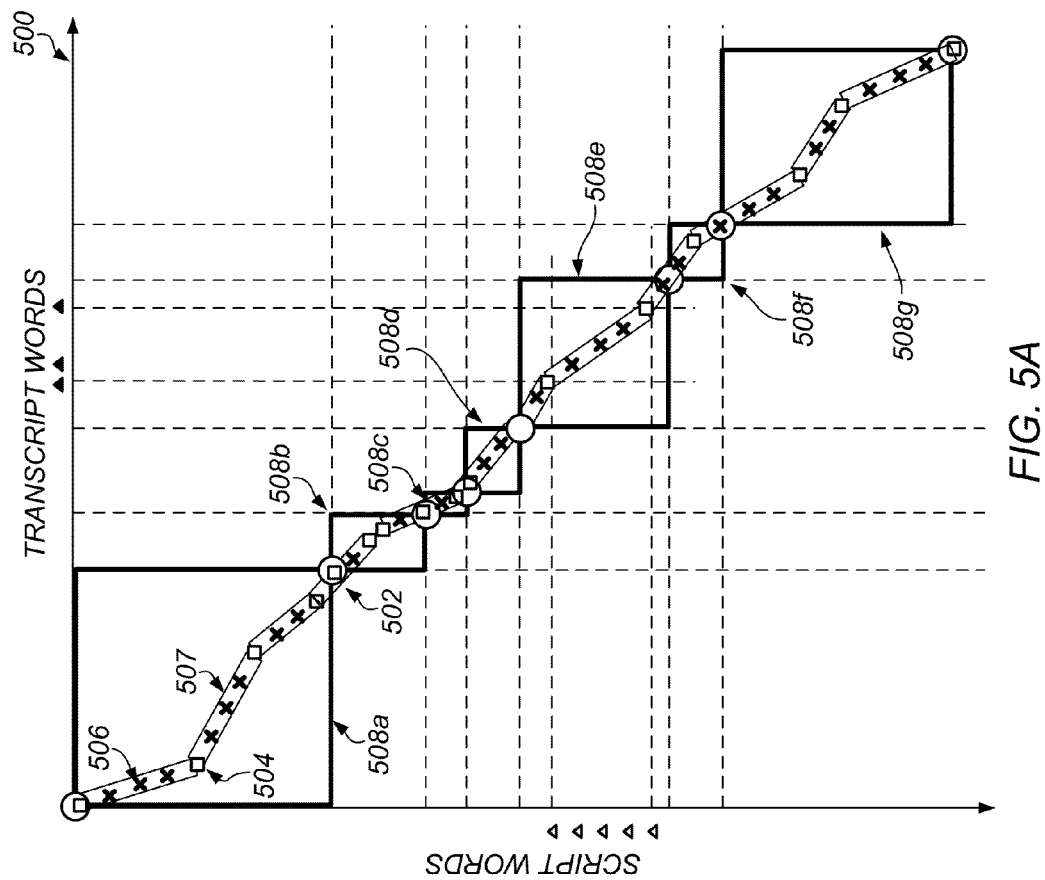
FIG. 5A is a depiction of an exemplary alignment matrix in accordance with one or more embodiments of the present technique.

FIG. 5A depicts an exemplary (full) alignment matrix 500 in accordance with one or more embodiments of the present technique. Alignment matrix 500 may include some or all of the script words aligned in sequence along the y-axis and all of some of the transcript words aligned in sequence along the x-axis, or vice versa. In an ideal alignment match (which may rarely be the case) script words and transcript words would match exactly, resulting in a substantially straight line having a slope of about one or negative one.

As depicted in the illustrated embodiment, several (e.g., eight) hard alignment points 502 (denoted by circles) are identified. Between each of the hard-alignment points 502 are a number of soft alignment points 504 (denoted by squares) and/or interpolated alignment points 506 (denoted by X's). Hard alignment points 502 may be determined as a result of matching/merging N-gram sequences as discussed above with respect to blocks 408 and 410. Soft alignment points 504 may be determined as a result of additional processing, such as use of a standard/optimized Leveshtein algorithm, discussed in more detail below. Interpolated alignment points 506 may be determined as a result of additional processing, such as linear or non-linear interpolation between hard and/or soft alignment points, discussed in more detail below. Interpolation intervals 507 extend between adjacent soft alignments points 504.

As depicted, alignment matrix 500 may include one or more alignment sub-matrices 508a-508g (referred to collectively as sub-matrices 508). Sub-matrices 508a-508g may be defined by the set of points (e.g., script words and transcript words) that are located between adjacent, respective, hard alignment points 502. For example, in the illustrated embodiment, matrix 500 includes seven sub-matrices 508a-508g. An exemplary sub-matrix 508e is also depicted in detail in FIG. 5B.

In some embodiments, method 400 includes pre-processing a sub-matrix, as depicted at block 414. Pre-processing of the sub-matrix may be provided at matrix aligner 208. In some embodiments, pre-processing the sub-matrix may include identifying the range of a particular sub-matrix (e.g., the range/sequence of associated script words and transcript words associated with the axis of the particular sub-matrix).

For example, script and transcript words that fall between two words contained in adjacent hard alignment points 502 may be identified as a matrix sub-set of script words (SCR word sub-set) 510 (represented by outlined triangles) and a corresponding matrix sub-set of transcript words (STT word sub-set) 512 (represented by solid triangles), as depicted in FIG. 5B with respect to sub-matrix 508e. It will be appreciated that the triangles of FIGS. 5A and 5B represent only sub-sets of the script and transcript words, as each axis may represent all of the words for a particular portion of a clip, scene or entire movie being aligned.

In some embodiments, prior to words of SCR word sub-set 510 being aligned to words of STT word sub-set 512 of sub-matrix 508e, a timecode and position offset data structure used for booking is initialized. In some embodiments, all special symbols and punctuation are removed from SCR word sub-set 510. This may provide for a more accurate alignment as both symbols and punctuations are typically not present in a transcript 114, and, are, thus, not present in STT word sub-set 512.

In some embodiments, sub-matrices 508 of the initial alignment matrix 500 are sequentially processed (e.g., in order of their location along the diagonal of the alignment matrix 500) to find the best time alignment for words between each pair of hard reference points 502 that define each respective sub-matrix 508a-508g. Where system 100 includes a single core system used to process the sub-matrices, alignment of the sub-matrices 508 may be processed sequentially (e.g., in series—one after the other). Where system 100 includes a multi-core system used to process sub-matrices, alignment of some or all of sub-matrices 508 may be processed in parallel (e.g., simultaneously). Such parallel processing may be possible as the processing of each sub-matrix is independent of all of the other sub-matrices due to the bounding of the matrices with hard alignment points that are assumed to be accurate and that include known timecode information.

In the illustrated embodiment, method 400 includes aligning the sub-matrix, as depicted at block 416. Aligning the sub-matrix may be provided at matrix aligner 208. In some embodiments, a sub-matrix may be aligned using an algorithm. An algorithm may employ a dynamic programming technique to assess multiple potential alignments for a sub-matrix, to determine the best fit alignment of the potential alignments, and employ the best fit alignment for the given sub-matrix. For example, an algorithm may identify several possible solutions within the sub-matrix, and may select the solution having the lowest indication of possible error. In some embodiments the algorithm may include a Levenshtein Word Edit Distance algorithm. Where a traditional Levenshtein algorithm is employed, a dynamic programming algorithm for computing the Levenshtein distance may require the use of an (n+1)×(m+1) matrix, where n and m are the lengths of the two respective word sets (e.g., the SCR word set and the STT word set). The algorithm may be based on the Wagner-Fischer algorithm for edit distance.

In some embodiments, an alignment path defines a potential sequence of words that may be used between hard alignment points. In some embodiments, aligning the sub-matrix may include breaking alignment paths within each sub-matrix into discrete sections during processing to more accurately assess individual portions of the alignment path. Based on match probabilities/strengths of various portions of the alignment path, a single alignment path may be broken into separate discrete intervals that are assessed individually. For example, where an alignment path within a sub-matrix includes a first portion having a relatively high match probability and an adjacent second portion having a relatively low match probability, the first and second portions can be separated. That is, the first portion may be identified as a sequence of words having a high probability of a match, and the second portion may be identified as a sequence of words having a low probability of a match. Accordingly, the first portion may be identified as an accurate match that can be relied on in subsequent processing and the second portion may be identified as an inaccurate match that should not be relied on in subsequent processing. Such a technique may be used in place of merely identifying a mediocre match of the entire alignment path that may or may not be reliable for use in subsequent processing.

In some embodiments, aligning the sub-matrix may include weighting various processing operations to reflect operations that may be indicative of inaccuracies. For example, in some embodiments, aligning the sub-matrix may include assessing weighting penalties for matched words that are subject to an insert, delete, or substitute operation. Such a technique may help to adapt to false-positive word identifications produced by an STT engine.

In some embodiments, the algorithm may be modified in an attempt to improve alignment. For example, in some embodiments, timecode information recorded with each word of an STT word set is correlated with a matching word of a corresponding SCR word set. The matching word may include a single word or a continuous sequence of words, wherein the sequence of words includes less than the number ("N") of words required by the selected N-gram. The resulting alignments from this process are referred to as "soft alignment points." In some embodiments, an algorithm, such as a Levenshtein Word Edit Distance algorithm, may be used to identify soft-alignment points. The soft designation is used to indicate that because of noise, error artifacts, and the like in STT transcript 114, these alignments may have a lower probability of being accurate than the multi-word, hard-alignment points that define the range/partition of the respective sub-matrix. In some embodiments, soft-alignment points may be determined using heuristic and/or phonetic matching.

In some embodiments, aligning the sub-matrix may include heuristic filtering. Heuristic filtering of noise may include filtering (e.g., ignoring or removing) "stop words" (e.g., short articles such as "a", "the", etc.) that are typically inserted into an STT transcript when the STT engine is confused or otherwise unable to decipher the audio track. For example, STT engines often insert articles such as "a", "the", etc. while various events other than dialogue occur, such as the presence of noise, music or sound effects. Such articles may also be inserted when dialogue is present but cannot be deciphered by the STT engine, such as when noise, music or sound effects drown out dialogue or narration. As a result, the STT transcript may include a sequence of "the the the the the the the . . ." indicative of a duration when music or other such events occur in the audio content. Thus, heuristics may be used to identity portion transcript words that should be ignored. For example, transcript words that should not be considered in the alignment process, and/or should not be included in the resulting time-aligned script data.

In some embodiments, heuristics may be used to identify repetitive sequences of words, and to determine which of the repeated sequence of words, if any need to be included or ignored in the resulting script document. For example, where a clip includes repetitive dialogue, such as where an actor repeats their lines several times in an attempt to get the line correct, transcript 114 may include several repetitions (e.g., "i'll be back i'll be back i'll be back). A corresponding portion of script 110 may include a single recitation of the line (e.g., "I'll be back."). In one embodiment, heuristics may be implemented to identify the repeated phrases, to identify one of the phrases of the transcript for use in aligning with script words, and to align the corresponding script words to the selected phrase of transcript 114. For example, only the timecodes for words of one of the three phrases in transcript 114 may be associated with the corresponding script words of the phrase "I'll be back". In some embodiments, the other repeated phrases are ignored/deleted. For example, ignored/deleted transcript words may not be considered in the alignment process, and/or may not be included in the resulting time-aligned script data. Ignoring/deleting the phrases may help to ensure that they do not create errors in aligning other portions of script 110. For example, if the additional phrases were not ignored/deleted, alignment may attempt to match the other two repeated phrases (e.g., those not selected) with phrases preceding or following the corresponding phrase of script 110. In some embodiments, instead of just throwing out (ignoring/deleting) the other repeated takes, they can also be aligned as "alternate takes". For example, it may not know which take will eventually be used in a finished edit, so regardless of which take is used, the correct script text and timing information may flow through to that portion of the recorded clip in use. In some embodiments, a single portion script text may be aligned to each of the repeated portions of the transcript text.

In some embodiments, aligning the sub-matrix may include matching based at least partially on phonetic characteristics of words. For example, a word/phrase of the SCR word set may be considered a match to a word/phrase of the STT word set when the two words/phrases sound similar. In some embodiments, a special phonetic word comparator may be used to assess word/phrase matches. A phonetic comparator may include "fuzzy" encodings that provide for matching script words/phrases that may sound similar to a word identified in the STT transcript. Thus, a word/phrase may be considered a match if they fall within a specific phonetic match threshold. For example, a script word may be considered a match to a transcript word if the transcript word is a word identified as being an phonetic equivalent to the word in script 110, or vice versa. For example, the terms "their" and "there" may be identified as phonetic matches although the terms do not exactly match one another. Such a technique may account for variations in spoken language (e.g., dialects) that may not be readily identified by an STT engine. Use of phonetic matching may be used in place of or in combination with an exact word/phrase match for each word/phrase.

In the illustrated embodiment, method 400 includes generating and/or interpolating intervals, as depicted at block 418. Generating and/or interpolating intervals may be provided at interval generator/interpolator 210. In some embodiments, generating and/or interpolating intervals may include identifying intervals between identified matched words (e.g., words of hard and/or soft reference points), interpolating the relative position of un-matched words between the matched words. An interpolated timecode for the un-matched words may be based on their interpolated position between the matched words and the known timecodes of the matched words. For example, after some or all of the sub-matrices are aligned, the sub-matrices are combined to form a list including script words and corresponding transcript words for each word associated with a hard or soft alignment point. At this stage of processing, all possible word alignment correspondences have been identified, leaving only unmatched script dialogue words (e.g., words that are not associated with hard nor soft reference points), and non-dialogue words within the script such as scene action descriptions and other information. These unmatched dialogue words still need to be assigned accurate timecodes to complete the script time-synchronization process.

In some embodiments, the timecode information for the unmatched script words is provided via linear timecode interpolation. Linear time code interpolation may include defining an interval that extends between two adjacent reference points, and spacing each of the unmatched words that occur between the two reference points across equal time spacing (e.g., sub-interpolation intervals) within the interval. A sub-interpolation interval may be defined as:

$$\text{sub\_interpolaton\_interval} = \frac{t1 - t2}{n + 1} \quad (1)$$

Where $t_1$ is a timecode of a first reference point defining a first end of an interpolation interval, $t_2$ is a timecode of second reference point defining a second end of the interpolation interval, and n is the number of unmatched words.

Where three unmatched words are identified in the script as being located between two matched words having timecodes of one second and two seconds, a first of the unmatched words may be determined to occur at 1.25 seconds, a second of the unmatched words may be determined to occur at 1.50 seconds, and a third of the unmatched words may be determined to occur at 1.75 seconds. In the above described embodiment, the sub-interpolation interval is equal to (2 sec−1 sec)/(3+1), or 0.25 sec. FIG. 5B illustrates interpolated points 506 for unmatched script words that are evenly spaced between soft alignment points in accordance with the above described linear interpolation technique. A similar technique may be repeated for each respective interpolation interval between hard/soft alignment points.

In the illustrated embodiment of FIG. 4, method 400 includes assigning timecodes, as depicted at block 420. Assigning timecodes may be provided at time-coded script generator 212. In some embodiments, assigning time codes includes assigning times for each of the script words based on the reference points and interpolated points. For example, in some embodiments, the entire list of soft alignment points is scanned and each successive pair of soft alignment points defines an interpolation interval. Upon defining each interpolation interval, sub-interpolation intervals are determined, and timecode data aligning with the sub-interpolation intervals is assigned to all of the script words of the respective script word set. For example, the unmatched words of the above described interpolation interval may be assigned timecodes of 1.25 seconds, 1.50 seconds, and 1.75 seconds, respectively. Further, techniques for interpolating are discussed in more detail below with respect to FIGS. 8A and 8B.

In some embodiments, a non-linear interpolation technique may be employed to assess and determine timecode information associated with words/phrases within a script document. For example, non-linear interpolation or similar matching techniques may be used in place of or in combination with linear interpolation techniques employed to determine timecodes for script words. Non-linear interpolation may be useful to account for words that were not spoken at even rate between alignment points. For example, where two alignment points define an interval having matched words on either end and several unmatched words between them, linear interpolation may assign timecode information to the unmatched words assuming an even spacing across the interval as discussed above. The resulting timecodes may be reflective of someone speaking at a constant cadence across the interval. Unfortunately, the resulting timecode information may be inaccurate due to different rates of speech across the interval, pauses within the interval, or the like.

Figure 7A:
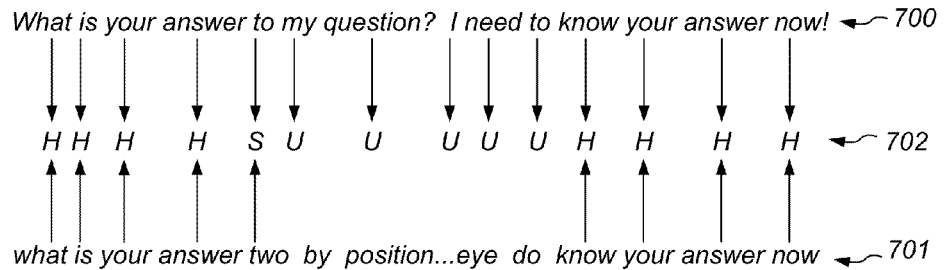
FIG. 7A is a depiction of multiple lines of text that include a script phrase, a transcript phrase and a corresponding representation of alignment in accordance with one or more embodiments of the present technique.

In some embodiments, non-linear interpolation of timecode information may include assessing an expected rate (or cadence) for spoken words and applying that expected rate to assess and determine timecode information for the unmatched words. For example, non-linear interpolation may include, for a given script word, determining a rate of speaking for matched script words proximate the script word, and applying the rate of speaking to determine a timecode for the script word. FIG. 7A illustrates alignment of a script phrase 700 (e.g., a portion of script data 110) with a spoken phrase 701 (e.g., a portion of transcript 114) that may be accomplished using non-linear interpolation in accordance with one or more embodiments of the present technique. In the illustrated embodiment, script phrase 700 is illustrated in association with an alignment 702. Phrase 700 includes, "What is your answer to my question? I need to know your answer now!" Alignment 702 includes a series of word-match indicators (e.g., word associated with a hard alignment point (H) and words associated with a soft alignment point (S)) and words that are unmatched (U). The dots/points between the unmatched representations of "question" and "I" may indicate a pause between speaking of the words (e.g., a pause that would be indicated by timecode information differential between transcript words "position" and "eye" of spoken phrase 701). The sequence of four words "What is your answer to" and "know your answer now" include matches, and the words, "my", "question", "I", "need" and "to" are unmatched.

In some embodiments, rates of speaking matched words proximate/adjacent (e.g., before or after) unmatched words may be used to assess and determine timecode information for the unmatched words. For example, in the illustrated embodiment, the rate of speaking "What is your answer to" may be used to assess and determine timecode information for the words "my" and "question." That is, if it is determined that "What is your answer to" is spoken at a rate of one word every 0.1 seconds (e.g., via timecode information provided in the transcript and/or prior alignment/matching), the following words "my question" may be assigned timecode information in accordance with the rate of 0.1 words per second. For example, where the word "to" is determined to have been spoken at exactly twenty-one minutes (21:00.0) within a movie, it may be determined that the word "my" was spoken at twenty-one minutes and one-tenth of a second (21:00.1) and that the word "question" was spoken at twenty-one minutes and two-tenths of a second (21:00.2). Thus, timecodes associated with twenty-one minutes and one-tenth of a second (21:00.1) and twenty-one minutes and two-tenths of a second (21:00.2) may be assigned to the words "my" and "question", respectively, in aligned script data 116, for example.

In some embodiments, punctuation within the script may also be used to assess and determine timecode information. In one embodiment, for instance, punctuation indicative of the end of a phrase may be used to determine the presence of a pause between words or phrases. For example, the presence of the question mark in phrase 700 may indicate that the phrases "What is your answer to my question?" and "I need to know your answer now!" may be separated by a pause and, thus may each be spoken at different rates. Such a technique may be employed to assure that non-linear interpolation is applied to the individual phrases within a sub-matrix to account for an expected pause. For example, in the illustrated embodiment, the rate of speaking "know your answer now" may be used to assess and determine timecode information for the words "I", "need" and "to". That is, if it is determined that "know your answer now" was spoken at a rate of one word every 0.2 seconds (e.g., via timecode information provided in transcript 114), the preceding words "I need to" may be assigned timecode information in accordance with the rate of 0.2 words per second. For example, where the word "know" is determined to have been spoken at exactly twenty-one minutes and ten seconds (21:10.00) within a movie, it may be determined that the word "I" was spoken at twenty-one minutes nine and four-tenths of a second (21:09.4), that the word "need" was spoken at twenty-one minutes nine and six-tenths of a second (21:09.6), and the word "to" was spoken twenty-one minutes nine and eight-tenths of a second (21:09.8). Timecodes associated with twenty-one minutes nine and four-tenths of a second (21:09.4), twenty-one minutes nine and six-tenths of a second (21:09.6), and twenty-one minutes nine and eight-tenths of a second (21:09.8) may be assigned to the words "I", "need", and "know", respectively, in aligned script data 116, for example. Accordingly, punctuation may be used to identify pauses or similar breakpoints that can be used to break words or phrases into discrete intervals such that respective rates of speaking (e.g., cadence) can be appropriately applied to each of the discrete intervals. Other indicators may be used to indicate characteristics of the spoken words. For example, "stopwords" present in the transcript may be indicative of a pause or break in speaking and may be interpreted as a pause and implemented as discussed above.

It is noted that with some linear interpolation techniques, the unmatched words may be assigned timecode information based on even spacing between the matched words, and thus, may not account for the pause or similar variations. For example, in the embodiment of FIG. 7A, where the first of the words "to" is determined to have been spoken at exactly twenty-one minutes (21:00.0) and the word "know" is determined to have been spoken at exactly twenty-one minutes and ten seconds (21:10.0), the five unmatched words "my", "question", "I", "need" and "to" would be evenly spaced across the ten second interval at 1.67 second intervals, not accounting for the pause. Although minor in these small increments, this could lead to increased alignment errors where a pause in dialogue occurs for several minutes, for example.

In some embodiments, a rate of speech may be based on machine learning. For example, a rate of speech may be based on other words spoken proximate to the words in question. In some embodiments, a rate of speech may be determined based on elements of the script. For example, a long description of an action item may be indicative of a long pause in the actual dialogue spoken.

In some embodiments, words of the script that occur proximate/between reference points may be aligned with unmatched words of the transcript that also occur proximate/between the same reference points. For example, in the illustrated embodiment of FIG. 7A, the four unmatched words "my", "question", "I" and "need" of script phrase 700 fall within in the interval between matched words "to" and "know". Where four unmatched words of transcript phrase 701 also fall within the same interval, the timecodes associated with the unmatched words of transcript phrase 701 may be assigned to the four unmatched words "my", "question", "I" and "need" of script phrase 700, respectively. That is the timecode of the first unmatched transcript word in the interval may be assigned to the first unmatched script word in the interval, the timecode of the second unmatched transcript word in the interval may be assigned to the second unmatched script word in the interval, and so forth.

In some embodiments, punctuation and/or capitalization from script text may be used to improve alignment. For example, if the first alignment point (hard or soft) occurs in the middle of the first sentence of the clip, it may be determined that the script words and transcript words preceding the alignment point in the script text and the corresponding transcript text should align with one another. In some embodiments, the timecodes for the script words may be interpolated (e.g., linearly or non-linearly) across the time interval that extends from the beginning of speaking of the corresponding transcript words in the scene to the corresponding alignment point. In some embodiments, the corresponding script words and transcript words may have a one-to one correspondence, and, thus, timecode information may be directly correlated. For example, the first script word of the sentence may be associated with the timecode information of the first transcript word of the clip, the second script word of the sentence may be associated with the timecode information of the second transcript word of the clip, and so forth. The beginning of a sentence may be identified by a capitalized word and the end of a sentence may be identified by a period, exclamation point, question mark, or the like.

Figure 7B:
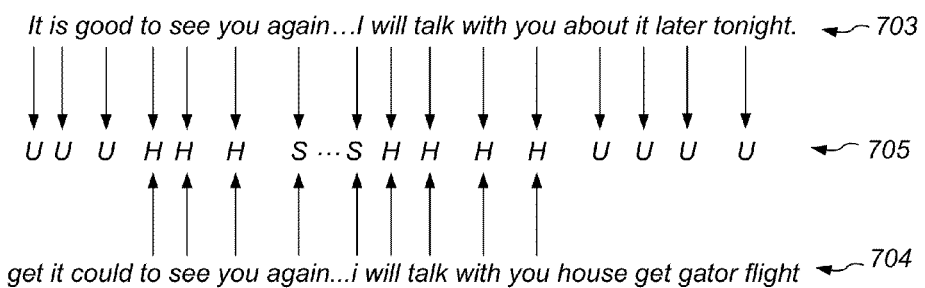
FIG. 7B is a depiction of multiple lines of text that include a script phrase, a transcript phrase and a corresponding representation of alignment in accordance with one or more embodiments of the present technique.

FIG. 7B is a depiction of multiple lines of text that include a script phrase, a transcript phrase and a corresponding representation of alignment in accordance with one or more embodiments of the present technique. More specifically, FIG. 7B illustrates alignment of a script text 703 (e.g., a portion of script 110) with a spoken dialog 704 (e.g., a portion of transcript 114) that may be accomplished with the aid of capitalization and punctuation in accordance with one or more embodiments of the present technique. Script text 703 includes a portion of a script that is spoken throughout a clip/scene. More specifically, in the illustrated embodiment, script text 703 includes the first sentence of the clip/scene (e.g., "It is good to see you again") and the last sentence of the clip/scene (e.g., "I will talk to you later tonight"). Spoken dialog 704 may include transcript text of a corresponding clip (e.g., "get it could to see you again" and "i will talk with you house get gator flight"). In the illustrated embodiment, script text 703 and transcript text 704 is illustrated in association with an alignment 705. Alignment 705 includes a series of word-match indicators (e.g., word associated with a hard alignment point (H) and words associated with a soft alignment point (S)) and words that are unmatched (U). As depicted, the first alignment point occurs midway though the first sentence of the scene/clip, and the first four words of the scene/clip are unmatched. In some embodiments, timecode for the script words at the beginning of the scene/clip that precede the first alignment point (e.g., "It is good") may be interpolated across the time interval that extends from the beginning of speaking of the corresponding transcript words in the scene/clip to the corresponding alignment point (e.g., interpolated between the timecode of the transcript words "get" and "to" in the transcript phrase 704). In the illustrated embodiment, the number of corresponding unmatched script words and transcript words has a one-to-one correspondence, and, thus, timecode information may be directly correlated. For example, there are three words in each of script phrase 703 and transcript phrase 704 that precede the first alignment point, and, thus, the first three script words ("It", "is" and "good") may each be assigned timecodes of the first three transcript words ("get", "it" and "could"), respectively. Similarly, the location of the alignment points in the middle of the last sentence may enable the unmatched words "about", "it", "later", and "tonight" that are located between the last alignment point of the scene/clip and the period indicative of the end of the scene/clip, to be interpolated across the interval between the transcript words "you" and "flight" and/or to each be assigned timecode information corresponding to transcript words "house", "get", "gator", and "flight", respectively.

In some embodiments, script elements may be used to identify the beginning or end of a sentence. For example, if between two lines of dialog, there is a parenthetical script element that corresponds to a sound effect, such as a car crash, the presence of the sound effect, indicated by a pause or stop words, may be used to identify the beginning or end of adjacent lines of dialog. In some embodiments, the techniques described with regard to alignment points in the middle of a sentence at the beginning or end of a scene/clip may be employed. For example, where the an alignment point within the dialog is preceded by or flowed by unmatched points and an identifiable script element (such as a sound effect), the timecodes for the unmatched words that occur between the alignment point and the identifiable script element may be interpolated across the corresponding interval or otherwise be determined. That is, the intermediate script element may be used in the same manner as capitalization and/or punctuation is used as described above.

In some embodiments, the density of the words in the transcript may be used to assess and determine timecode information associated with the words in the script. For example, in the illustrated embodiment of FIG. 7, there are four unmatched transcript words in the interval of phrase 701 between matched words (e.g., "two" and "know") and there are five unmatched words (e.g., "my", "question", "I", "need" and "to") in the corresponding interval of phrase 700 between matched words (e.g., "to" and "know"). Based on the timecode information for the transcript words in the interval, it may be determined that two of the four unmatched transcript words are spoken at the beginning of the interval and that two of the four unmatched transcript words are spoken at the end of the interval. That is, about fifty percent of the spoken words were delivered in a first portion of the interval, no words were spoken in a second portion of the interval (e.g., during the pause) and about fifty percent of the words were spoken in a third portion of the interval. In one embodiment, a corresponding percentage of the script words (e.g., approximately equal to the percentage of transcript words) will be provided over the respective portions of the interval. For example, in the embodiment of FIG. 7A, where the word "to" (in the first portion of the phrase 700) that defines a start of the interval is determined to have been spoken at exactly twenty-one minutes (21:00.0), the word "know" defining an end of the interval is determined to have been spoken at exactly twenty-one minutes and ten seconds (21:10.0), the word "position" is determined to have been spoken at exactly twenty-one minutes and ten and two-tenths seconds (21:00.2), and the word "eye" is determined to have been spoken at exactly twenty-one minutes and nine and four-tenths seconds (21:09.4), the two unmatched script words "my" and "question" may be evenly spaced over the first portion of the interval from twenty-one minutes (21:00.0) to twenty-one minutes and ten and two-tenths seconds (21:00.2), and the three unmatched words "I", "need" and "to" may be evenly spaced across the third portion of the interval from twenty-one minutes and nine and four-tenths seconds (21:09.4) to twenty-one minutes and ten seconds (21:10.0). Thus, the distribution of script words within the interval is approximately equivalent to the distribution of transcript words in the corresponding interval. That is, about fifty percent of the script words in the interval are time aligned across the first portion of the interval before the pause and about fifty percent of the script words in the interval are time aligned across the third portion of the interval after the pause.

In some embodiments, a plurality of script words may be accepted for use in the time-aligned script data based on a confidence (e.g., high probability/density of word matches that were previously determined). Such a technique may enable blocks of text to be verified/imported from the script data to the time-aligned script data when matches within the blocks are indicative of a high probability that the corresponding script words are accurate. That is, the script data will be the text used in the time-aligned script data for those respective words of the script/dialogue. In some embodiments, a block of script words may be imported when word matches (e.g., hard alignment points and/or soft alignment points) meet a threshold level. For example, at least a portion of a block of words may be verified/imported for use in the aligned script when at least fifty percent of the words in the block are associated with a match (e.g., associated with hard and/or soft alignment points). In some embodiments, verifying/importing blocks of text may include using some individual script words having a match (e.g., associated with hard and/or soft alignment points) with words of the script, while importing/using unmatched transcript words (e.g., that are not associated with a soft and/or hard alignment points). In some embodiments, verifying/importing script words may include importing text characteristics, such as capitalization, punctuation, and the like. In the embodiment of FIG. 7A, more than fifty-percent of the words of script phrase 700 are identified as having a hard and/or soft match. In some embodiments, upon determining that the script text and transcript text have a high enough percentage of matches (e.g., exceeding a block match threshold), the script text may be used for the entire block of text in the aligned script document, including matched and unmatched words for use in the script-aligned data. For example, the block of corresponding script text "What is your answer to my question? I need to know your answer now!" may be used in the aligned script although all of the words do not have a match. The imported script words have incorporated the capitalization and punctuation of the corresponding text of the script document. Timecode information may be associated with each of the script and transcript words using any of the techniques described herein to properly time align the unmatched words of the phrase (e.g., to provide timecodes for the words "my question? I need to"). As discussed in more detail below, where a high confidence for a block of transcript words is provided, the transcript words (including those not matched) may be used in the resulting time-aligned script. Accordingly, if the transcripts words of the phrase "What is your answer to by position eye do know your answer now!" have a high confidence leave but are not all matched, the phrase may be used in the resulting text of the time-aligned script data. Note that both, the matched and unmatched words of the raw STT have been imported. Such a technique may facilitate use of transcript words in place of script words where the actor ad-libs or otherwise does not recite the exacting wording of the script.

In some embodiments, a user could choose for themselves whether to use the Script word(s) or SST transcript word(s), based on an indication, such as confidence level. For example, even if the confidence level assumes one is more accurate than the other, it may not be so, and the user may be provided an opportunity to correct this by switching use of one or the other in the script data. Also, the user can manually edit in a correction, and this correction could be automatically stamped with a 100% confidence label. In some embodiments, the automated changes/imports may be marked such that a user can readily identify them, and modify them as needed.

In some embodiments, confidence/probability information provided during STT operations may be employed to assess whether or not a word or block of words in a transcript meets threshold criteria, such that the transcript words may be used in the time-aligned script data in place of the corresponding script words. Such an embodiment may resolve discrepancies by using the transcript word in the aligned script data 116 where there is a high confidence that the transcript word is accurate and the corresponding script word is not (e.g., where an actor ad-libs a line such that the actual words spoken are different from the words in the script). In one embodiment, an STT engine may provide a high confidence level (e.g., above 90%) for a given transcript word, and, thus, the transcript word is considered to meet the threshold criteria (e.g., 85% or above). That is, the word in the transcript may be more accurate than corresponding script words. As a result, the transcript word is provided in the aligned script data, in place of a corresponding script word. In some embodiments, a confidence/probability provided by an STT operation may be used in combination with matching criteria. For example, where a low confidence level (e.g., below 50%) is provided for a script word as a result of matching/merging, and the STT engine provides a high confidence level (e.g., above 90%) for a corresponding transcript words, the transcript word may be provided in the aligned script data, in place of a corresponding script word. Conversely, where a high confidence level (e.g., above 90%) is provided for a script word as a result of matching/merging, and the STT engine provides a low confidence level (e.g., below 50%) for a corresponding transcript word, the script word may be provided in the aligned script data, in place of a corresponding transcript word.

In some embodiments, a portion of the script may be longer than a corresponding clip. As a result, the portion of the script that is actually spoken may be time aligned appropriately, and the unspoken portions of the script may be bunched together between aligned points. The bunching of words may result in timecode information being associated with the bunched words that indicates them being spoken at an extremely high rate, when in fact they may not have been spoken at all. In some embodiments, a threshold is applied to ignore or delete words that appear to have been spoken too quickly such that bunched words may be ignored or deleted. For example, a threshold word rate may be set to a value that is indicative of the fastest reasonable rate for a person to speak (e.g., about six words per second). In some embodiments, the threshold word rate may be set to a default value, may be determined automatically, or may user selected. A speaking rate may be customized based on the character speaking the dialogue. For example, one actor may speak slowly whereas another actor may speak much faster, and thus the slower speaking character's dialogue may be associated with a lower threshold rate, where as the faster speaking character's dialogue may be associated with a higher threshold rate. Automatically determining a threshold word rate may include sampling other spoken portions of a script (e.g., other lines delivered by the same character) to determine a reasonable rate for words that are actually spoken, and the threshold rate may be set at that value or based off of that value. For example, where one portion of a script includes an average word rate of five words per second, a maximum word rate threshold may be set to approximately twenty percent greater than that value (e.g., about six words per second). Such a cushion may account for natural variations in speaking rate that may occur while still identifying unlikely variations in speaking rate. In some embodiments, words having spacing that do not fall within the maximum word rate threshold are ignored or deleted, such that they are not aligned. For example, a script may read:

HENRY
That's his name. Henry Jones, Junior.
INDY
I like Indiana more than the name Henry Jones, Junior.
HENRY
We named the dog Indiana.

The corresponding video content (e.g., clip) however, may only include an actor reciting Henry's lines, one after the other. Thus, the lines delivered for Henry may be provided accurate timecode information associated with the time periods in which the two lines are spoken, however, the line associated with Indy, that is not spoken, may be bunched into the pause between delivery of Henry's first and second lines. For example, if Henry's lines were delivered one-after the other, with a half-second pause in-between, the phrase "I like Indiana more than the name Henry Jones, Junior" may not be matched (because it was not actually spoken) and, thus, may be interpolated (e.g., linearly) over the half-second time frame between the lines in the script. Corresponding timecode information may indicate that "I like Indiana more than the name Henry Jones, Junior" was spoken at a rate of one word about every five one-hundredths of a second, or about twenty words per second. Where the maximum word threshold is set to about six words per second, the determined rate of about twenty words per second would exceed the maximum word threshold. Thus the phrase "I like Indiana more than the name Henry Jones, Junior" may be ignored/deleted, such that alignment may be provided for only the lines actually spoken (e.g., Henry's lines). The phrase "I like Indiana more than the name Henry Jones, Junior" may not be provided in the time-aligned data 116.

In some embodiments, words that were bunched at the beginning or end of dialogue (e.g., the script text that was linearly interpolated and bunched before or after the dialogue was actually spoken) may be identified and removed. For example, the following lines at the beginning of the dialogue were linearly interpolated:

| 01:58:00:02 1:5938 | ˆEXT./01:58:00:02 ˆENTRANCE/01:58:00:02 |
| 1:5939 Scene | ˆTO/01:58:00:02 ˆMOUNTAIN/01:58:00:02 |
| | ˆTEMPLE/01:58:00:02 ˆ-/01:58:00:02 |
| | ˆScene ˆAFTERNOON/01:58:00:02 |

Bunching of the words is indicated by them each having been assigned the same timecode, which may be a result of linearly interpolating over a very short period of time (e.g., prior to the start of actual dialogue of "Indy" following the above lines at time 01:58:00:04). In some embodiments, the bunched words are deleted/ignored such that they are not included or indicated as being aligned in the resulting aligned script data. Thus, interpolated alignment of text that is located at the beginning or end of dialogue and that is bunched into a short duration may be deleted/ignored.

In some embodiments, ignoring/deleting words that appear to exceed a maximum threshold rate may also help to eliminate "stopwords" generated by an STT engine from being considered for alignment. For example, where an STT engine inserts a plurality of "the,the,the, . . ." in place of music or sound effects, the high frequency of the words "the" may be identified and they may be ignored/deleted such that they are not aligned to words in the script. In some embodiments, the stopwords may be flagged (e.g., not recognized) so that a user can take further action if desired.

In some instances, a clip may include audio content having extraneous spoken words that are not intended to be aligned with corresponding script words. For example, extraneous words and phrases may include an operator calling out "Speed!" shortly before starting the camera rolling while audio is already being recorded, the director calling out "Action!" shortly before the characters beginning to speak lines of dialogue, the director calling out "Cut!" at the end of a take, or conversations inadvertently recorded shortly before, after, or even in the middle of a take. These cues typically occur at the beginning and end of shots, and, thus, processing may be able to recognize these words based on their location and/or their audio-waveforms that are recognized and provided in a corresponding STT transcript. If the entire recorded audio from the clip were to be analyzed, the extraneous/incidental words may provide significant challenges during alignment. For example, synchronization module 102 may align the extraneous words of the transcript to script words, resulting in numerous errors. User defined words, such as "Speed", "Action" and "Cut" may be defined and can be recognized by their audio waveforms and provided in a corresponding STT transcript. The user defined words may be automatically flagged for the user or deleted.

Figure 7C:
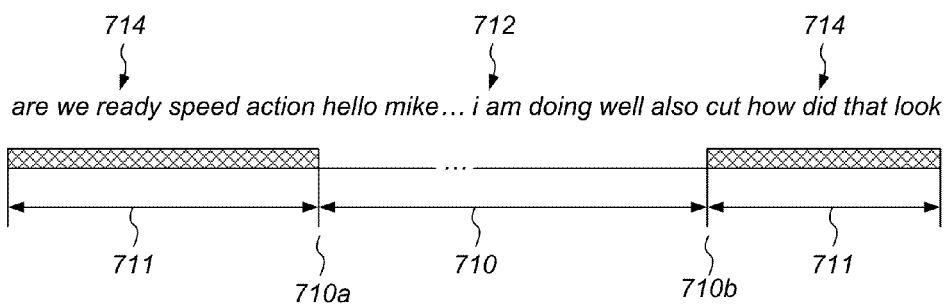
FIG. 7C is a depiction of a line of text and corresponding in/out ranges in accordance with one or more embodiments of the present technique.

In some embodiments, only a defined range of recorded dialogue is aligned to script text. Such a technique may be useful to ignore or eliminate extraneous recorded audio from the alignment analysis. For example, defining a range of recorded dialog may enable the analysis to ignore extraneous conversations or spoken words that are incidentally recorded just before or after a take for a given scene. In some embodiments, an in/out range defines the portion of the audio that is aligned to a corresponding portion of the script. Defining an in/out range may define discrete portions of the script (e.g., script word) and/or audio content (e.g., transcript words) to analyze while also defining discrete portions of the audio content data to ignore during the alignment of transcript words with corresponding script words, thereby preventing extraneous words (e.g., transcript words) from inadvertently being aligned with script words. FIG. 7C is a depiction of a line of text and corresponding in/out ranges in accordance with one or more embodiments of the present technique. More specifically, FIG. 7C illustrates an exemplary in-range 710 and out-ranges 711. The in-range 710 and out-ranges 711 limits analysis to only audio content of in-range 710, referred to herein as audio content of interest 712, and excludes audio content not located within in-range 710 (e.g., content located in out-ranges 711). Audio content of interest 712 may include the dialogue or narration spoken during the respective clip that falls within one or more specified in/out-ranges. Extraneous audio content 714 may include words captured on the audio that are not intended to be aligned with a corresponding portion of script document, and, thus, fall outside of the one or more specified in/out-ranges. In the illustrated embodiment, audio content of interest 712 includes the transcribed phrase "hello mike . . . I am doing well also" and extraneous audio content 714 includes the phrases/words "are we ready speed action" spoken at the head of the clip, just before audio content of interest 712 and "cut how did that look" spoken at the tail of the clip, just after audio content of interest 712. As depicted, in range 710 is defined by an in-marker 710*a* and an out-marker 710*b*. In-marker 710*a* defines a beginning of audio content of interest 712, and out-marker 710*b* defines an end of audio content of interest 712. By specifying an in/out range, other portions of the dialog may be excluded from the analysis. For example, in the illustrated embodiment, extraneous content 714 at the head and tail of the clip is ignored during analysis, as indicated by the grayed out bar in FIG. 7C.

In the illustrated embodiment, only a single in-range 710 is depicted, however, embodiments may include multiple discrete ranges defined within a single clip. For example, two additional in/out markers may be added within in-range 710, thereby dividing it into two discrete in-ranges and providing an additional out-range embedded therein. In some embodiments, the use of in/out-ranges may be employed to resolve issues normally associated with multiple takes of a given scene or clip. For example, a user could select the desired portion of the take by selecting an in-range that includes the desired take and/or selecting an out-range that excludes the undesired takes. In some embodiments, an out-range may be located at any portion of the clip. For example, in a case opposite from that depicted, the in/out-ranges may be swapped, thereby ignoring extraneous audio data in the middle of the clip, while analyzing audio content of interest at the head and tail of the clip.

In some embodiments, markers 710a and 710b may be user defined. For example, a user may be presented with a display similar to that of FIG. 7C and may use a slider-type control to move markers 710a and 710b, thereby windowing in/out-ranges 710 and 711. Thus, a user may view some or all of the text and may cut-out the extraneous audio content 714 using in/out-ranges. In some embodiments, markers 710a and 710b may be defined as an offset of a given duration of time or number of words. For example, an offset of ten-seconds may exclude ten seconds of audio data at the head or tail of the clip. Such a technique may be of particular use where there is a consistent delay at the beginning or end of filming a clip. An offset of five words may exclude the first and/or last five words of spoken dialog at the head or tail of the clip. Such a technique may be of particular use where there is a consistent phrase or series of words spoken at the beginning or end of filming a clip. In some embodiments, the offsets may be predetermined and/or user selectable. For example, a default offset value may be employed, but may be editable by a user (e.g. via a sliding window as described above).

In some embodiments, portions of the audio content may include extraneous audio other than spoken words, such as music or sound effects. If analyzed, the extraneous audio may create an additional processing burden on the system. For example, synchronization module 102 may dedicate processing in an attempt to match/align extraneous transcript words (e.g., stop words) to script words. In some embodiments, the extraneous audio content may be identified and ignored during alignment. Such a technique may enable processing to focus on dialogue portions of audio content, while skipping over segments of extraneous audio. In some embodiments, the audio content may be processed to classify segments of the audio content into one of a plurality of discrete audio content types. For example, segments of the audio content identified as including dialogue may be classified as dialogue type audio, segments of the audio content identified as including music may be classified as music type audio, and segments of the audio content identified as including sound effects may be classified as sound effect type audio. For example, segments of transcript words that include a series of different words occurring one after another (e.g., how are you doing) and/or that are not indicative of stop words may be classified as a dialogue type audio, segments of transcript words that include a series of stop words of a long duration (e.g., the the . . . ) may be classified as a music type audio, and segments of transcript words that include a series of stop words of a short duration (e.g., the the) may be classified as a sound effect type audio. In some embodiments, segments of the audio content that cannot be identified as one of dialogue, music or sound effect type audio may be categorized as unclassified type audio. During subsequent processing, each of the segments may or may not be subject to alignment or related processing based on their classification. For example, during alignment of transcript words to script words, the segments associated with dialogue type audio may be processed, whereas the segments associated with music and sound effect type audio may be ignored. By ignoring music and sound effect type segments, processing resources may be focused on the dialogue segments, and, thus, are not wasted attempting to align the transcript words associated with the music and sound effect to script words. In some embodiments, unclassified type audio may be considered for alignment or may be ignored. In some embodiments, what classifications are processed and what classifications are ignored may include a default setting and/or may be user selectable.

In some embodiments, a weighting value is assigned to each word based on the alignment type (e.g., interpolation, hard alignment, or soft alignment). Stronger alignments (e.g., hard and soft alignments) may have higher weighting than weaker alignments (e.g., interpolation). In some embodiments, a total weighting is assessed for a window/interval that includes several consecutive words. The interval of several words is a sliding window that is moved to assess adjacent intervals/windows of words. When the total weighting (e.g., sum of weightings) of the words in a given interval/window meets a threshold value, it may be determined that the words are not merely bunched words, and timecodes may be assigned to one or more of the words, thereby, not ignoring/deleting the words in the window. Such a technique may be provided at the beginning and end of a set of dialogue to assess and determine the start and stop of the actual spoken dialogue and to ignore/delete the script dialogue that preceded/followed the spoken dialogue in the script, but was not actually spoken (e.g., the script text that was linearly interpolated as was bunched before or after the dialogue actually spoken).

In some embodiments, processing may be implemented to time-align script elements other than dialogue (e.g., scene headings, action description words, etc.) directly to the video scene or full video content. For example, where a script element, other than dialogue (e.g., a scene heading) occurs between two words having timecodes associated therewith (e.g., dialogue words in the time-aligned script data) the timecodes of the words may be used to determine a timecode of the intervening script element. For example, where a last word of a scene includes a timecode of 21:00.00 and the first word of the next scene includes a timecode of 21:10.00, a script element occurring in the script between the two words may be assigned a timecode between 21:00.00 and 21:10.00, such as 21:05.00. In some embodiments, one or more script elements may have their timecodes determined via linear and/or non-linear interpolation, similar to that described above. For example, the amount of content (e.g., the number of lines or number of words) within script elements may be used to assess a timecode for a given script element or plurality of script elements. Where a first script element between two words having timecodes includes half the amount of content of a second script element also located between the two words, the first script element may be assigned a timecode of 21:03.00 and the second script element may be assigned a time code of 21:05.00, thereby reflecting the smaller content and potentially shorter duration of the first element relative to the second element. In some embodiments, some or all of the script elements may be provided in the time-aligned script data in association with a timecode. In some embodiments, timecodes are first assigned to the dialogue words during initial alignment, and timecodes are assigned to the other script elements in a subsequent alignment process based on the timecodes of the dialogue determined in the initial alignment (e.g., via interpolation). The resulting time aligned data 116 may include timecodes for some or all of the script elements of script 104.

In the illustrated embodiment, method 400 includes generating a time-aligned script output, as depicted at block 422, as discussed above. Generating time-aligned script output may be provided via time-coded script generator 212. In some embodiments, each word or element of the script and/or transcript may be associated with a corresponding timecode. For example, the complete list of script word and/or transcript words that are associated with hard, soft and interpolated timecodes may be used to generate time-aligned data 116, including a final TimeCodedScript (TCS) data file which contains some or all of the script elements with assigned time codes. In some embodiments, the TCS data file may be provided to another application, such as the Adobe Script Align and Replace feature of Adobe Premiere Pro, for additional processing. In some embodiments, time-aligned data 116 may be stored in a database for use by other applications, such as the Script Align feature of Abode Premiere Pro.

In some embodiments, a graphical user interface may provide a graphical display that indicates where matches (e.g., hard and/or soft alignment points) or non-matches occur within a user interface. The user interface may include symbols or color coding to enable a user to readily identify various characteristics of the alignment. For example, hard alignments may be provided in red (or green) to indicate a good/high confidence, soft alignments in blue (or yellow) to indicate a lower confidence, and interpolated points in yellow (or red) to indicate an even lower confidence level. The user interface may enable a user to quickly scan the results to assess and determine where inaccuracies are most likely to have occurred. Thus, a user may commit resources for review and proofing efforts on portions of a time-aligned script that may be susceptible to errors (e.g., where no or few matches occur) and may not commit resources for review and proofing efforts on portions of a time-aligned script that may not be susceptible to errors (e.g., where a large number of matches occur). For example, a user may be presented with a chart, such as that illustrated in FIG. 5A. The chart may enable a user to readily identify portions of the script that do not include a high percentage of matches (e.g., the sub-matrix 508 located at the uppermost left portion of the chart). In some embodiments, high confidence areas may include a similar visual indicator (e.g., grayed out) and portions that may require attention may have appropriate visual indicators (e.g., bright colors—not grayed out).

In some embodiments, a user may be provided the option to select whether or not to use the text from the raw STT analysis or the text from the written script. For example, a user may be provided a selection in association with the sub-matrix 508 located at the uppermost left portion of the chart that enables all, some, or individual words contained in the sub-matrix to use the text from the raw STT analysis or the text from the written script.

In some embodiments, upon receiving a user input, the information may be returned to synchronization module 102 and processed in accordance with the user input. For example, where a user opts to use STT text in place of script text, synchronization module 102 may conduct additional processing to provide the corresponding time-aligned script data. In some embodiments, the user may be prompted for input while synchronization module 102 is performing the time alignment. For example, as the synchronization module 102 encounters a decision point, it may prompt the user for input.

Custom Language/Dictionary/Model

Some embodiments may include additional features that help to improve the performance of system 100. For example, in some embodiments, speech-to-text analysis (e.g., audio extractor 112 and/or the method of block 304) may provide the option of creating a custom dictionary (e.g., custom language model). In some embodiments, a custom dictionary may be generated for a given clip based on one or more reference scripts that have content that is the same or similar to the given script, or based on a single reference script that at least partially corresponds to the video content or exactly matches the audio portions of the video content. In some embodiments, such as where the reference script exactly matches the audio content, some or all words of the reference script may be used to define a custom dictionary, a raw speech analysis may be performed to generate a transcript using words of the custom dictionary to transcribe words of the audio content, transcript words may then be matched against the script words of the reference script to find alignment points, and the words of the reference script text may be paired with the corresponding timecodes, thereby providing a time-aligned/coded version of the reference script.

In some embodiments, a custom language model is generated for one or more portions of video content. For example, where a movie or scene includes a plurality of clips, a custom language module may be provided for each clip to improve speech recognition accuracy. In some embodiments, a custom language model is provided to a STT engine such that the STT engine may be provided with terms that are likely to be used in the clip that is being analyzed by the STT engine. For example, during STT transcription, the STT engine may at least partially rely on terms or speech patterns defined in the custom language model. In some embodiments, a custom language model may be directed toward a certain sub-set of language. For example, the custom language model may specify a language (e.g., English, German, Spanish, French, etc.). In some embodiments, the custom language model may specify a certain language segment. For example, the custom language module may be directed to a certain profession or industry (e.g., a custom language module including common medical terms and phrases may be used for clips from a medical television series). In some embodiments, the STT engine may weight words/phrases found in the associated custom language module over the standard language model. For example, if the STT engine associates a word with a word that is present in the associated custom language model and a word that is present in a standard/default language model, the STT engine may select the word associated custom language model as opposed to the word present in the standard/default language model. In some embodiments, a word identified in a transcript that is found in the selected custom language model may be assigned a higher confidence level than a similar word that is only found in the standard/default language model.

In some embodiments, a custom language model is generated from script text. For example, script data 110 may include embedded script text (e.g., words and phrases) that can be extracted and used to define a custom language model. Embedded metadata may be provided using various techniques, such as those described in described in U.S. patent application Ser. No. 12/168,522 entitled "SYSTEMS AND METHODS FOR ASSOCIATING METADATA WITH MEDIA USING METADATA PLACEHOLDERS", filed Jul. 7, 2008, which is hereby incorporated by reference as though fully set forth herein. A custom language model may include a word frequency table (e.g., how often each of the words in the custom language model is used within a given portion of the script) and a word tri-graph (e.g., indicative of other words that precede and followed a given word in a given portion of the script). In some embodiments, all or some of the text identified in the script may be used to populate the custom language model. Such a technique may be particularly accurate because the script and resulting language model should include all or at least a majority of the words that are expected to be spoken in the clip. In some embodiments, speech-to-text (STT) technology may implement a custom language model as described in U.S. patent application Ser. No. 12/332,297 entitled "ACCESSING MEDIA DATA USING METADATA REPOSITORY", filed Nov. 13, 2009, which is hereby incorporated by reference as though fully set forth herein In some embodiments, metadata included in the script may be used to further improve accuracy of the STT analysis. For example, where the script includes a clip identifier, such as a scene number, the scene number may be associated with the clip such that a particular custom language model is used for STT analysis of video content that corresponds to the associated portion of the script. For example, where a first portion of the script is associated with scene one and a second portion of the script is associated with scene two, a first custom language model may be extracted from the first portion of the script, and a second custom language model may be extract from the second portions of the script. Then, during STT analysis of the first scene, the STT engine may automatically use the first custom language model, and during STT analysis of the second scene, the STT engine may automatically use the second custom language model.

In some embodiments, when a clip contains only a few lines of dialogue in a short scene out of a very long script, knowing that the clip contains a specific scene number (e.g., harvested from the script metadata) allows focusing on the text in the script for that scene, and not having to assess the entire script.

Figure 6:
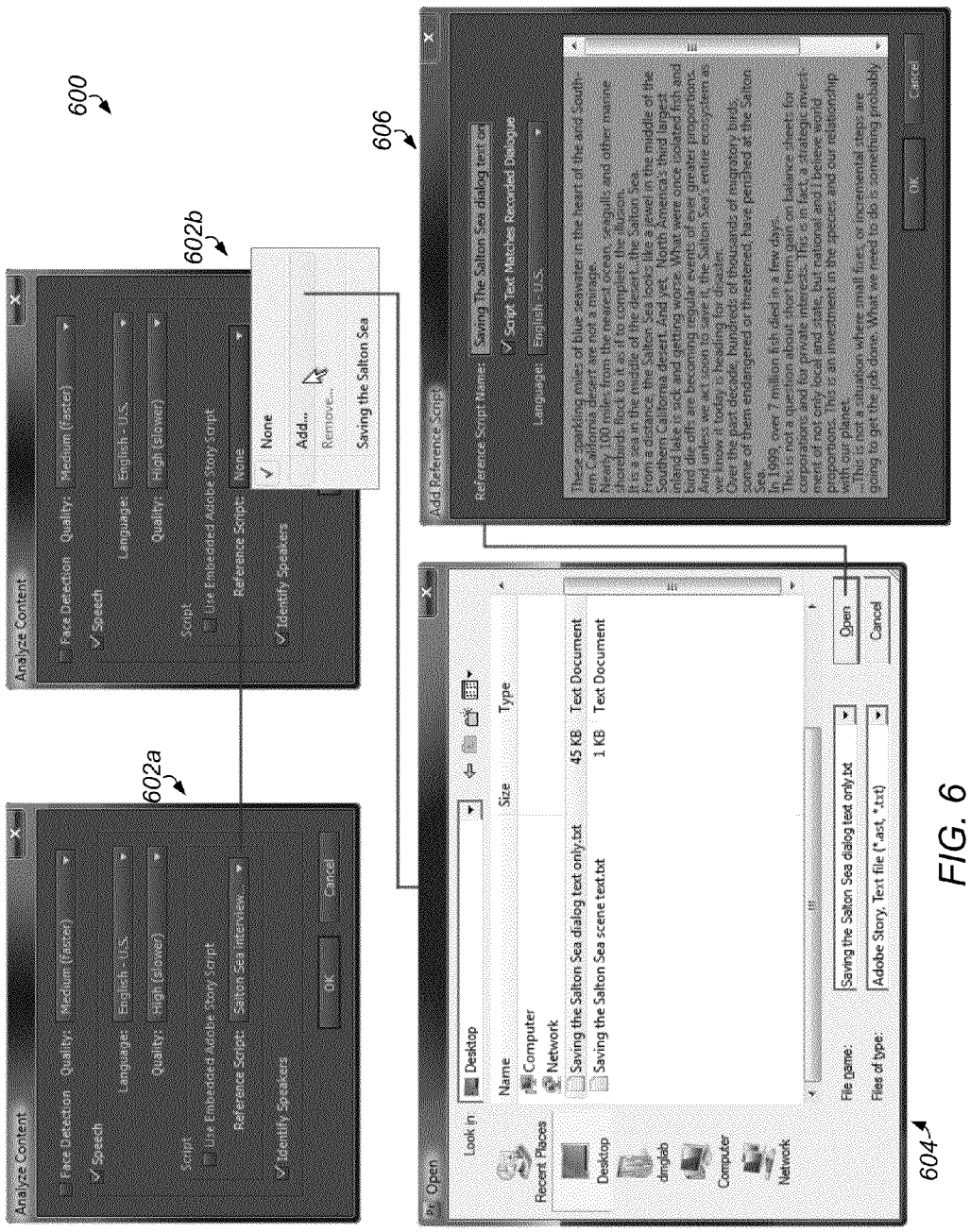
FIG. 6 is a depiction of an exemplary graphical user interface sequence in accordance with one or more embodiments of the present technique.

FIG. 6 depicts a sequence of dialogs 600 in accordance with one or more embodiments of the present technique. In some embodiments, a user may select a clip or group of clips, then chooses "Analyze Content" from a Clip menu, initiating the sequence of dialogs 600. The Analyze Content dialog may allow a user to use embedded Adobe Story Script text if present for the speech analysis, or to add a reference script which will be used to improve speech analysis accuracy. The sequence of dialogs 600 includes content analysis dialogs that allow users to import a reference script to create a custom dictionary/language model for speech analysis. A reference script may include a text document containing dialogue text similar to the recorded content in the project (e.g., a series of nature documentary scripts, or a collection of scripts from a client's previous training videos). In the Analyze Content dialog 602, a user may choose Add from the Reference Script menu. In the File Open dialog 604, a user may navigate to the reference script text file, select it and click OK. The Add Reference Script dialog 606 may open, where a user can name the reference script, choose a language, and view the text of the file below in a scrolling window. The "Script Text Matches Recorded Dialogue" option may be selected if the imported script exactly matches the recorded dialogue in the clips (e.g., a script the actors read their lines from). When a reference script is used that doesn't exactly match the recorded dialogue in the clips, the analysis engine automatically sets the weighting of the reference script vs. the base language model based on length, frequency of key words, etc. A user may click the OK button, the Import Script dialog closes, and the analysis of the reference script may begin. When analysis is complete, the reference script is selected in the Analyze Content's Reference Script menu. When a user clicks the OK button, the selected clip's speech content is analyzed.

Higher accuracy may be possible when the reference script matches the recorded dialogue exactly (e.g., the script that was written for the project or transcriptions of interview sound bites). In this scenario, a user may select the "Script Text Matches Recorded Dialogue" option in the Add Reference Script dialog 606, as discussed above. This may override the automatic weighting against the base language model and give the selected reference script a much higher weighting. Significantly higher accuracy can be achieved using matching reference scripts, although accuracy may be primarily dependent on the clarity of the spoken words and the quality of the recorded dialogue.

High accuracy (e.g., up to 100%) may be achievable when additional associated software packages in the production workflow are used in conjunction with one another. For example, an Adobe Story to Adobe OnLocation workflow may be used to embed the dialogue from each scene into a clip's metadata. In such a workflow, a script written in Adobe Story may be imported into OnLocation, which may produce a list of shot placeholders for each scene. These placeholders may be recorded direct to disk using OnLocation during production or merged with clips that are imported into OnLocation after they were recorded on another device. In both cases, the text for each scene from the original script may be embedded in the metadata of all the clips that were shot for that scene. Embedded metadata may be provided using various techniques, such as those described in described in U.S. patent application Ser. No. 12/168,522 entitled "SYSTEMS AND METHODS FOR ASSOCIATING METADATA WITH MEDIA USING METADATA PLACEHOLDERS", filed Jul. 7, 2008, which is hereby incorporated by reference as though fully set forth herein. When the clips are imported into Adobe Premiere Pro, the script text embedded in each of the clips may be automatically used as a reference script and, then, aligned with the recorded speech during the analysis. When enough hard alignment points reach a minimum accuracy threshold, the analyzed speech text is replaced with the script text embedded in the source clip's extensible metadata platform (XMP) metadata. This may result in speech analysis text that is at or near 100% accurate relative to the original script. Correct spelling, proper names and punctuation may also be carried over from the script. Accuracy in this workflow may be dictated by the closeness of the match between the reference script text and the recorded dialogue.

With regard to FIG. 6, in some embodiments, when the "Use Embedded Adobe Story Script Option" of Analyze Content dialog 602 is selected, Adobe Story script text embedded in an XMP will be used for analysis, and the Reference Script popup menu may be disabled. If the selected clip contains Adobe Story script embedded text, the "Use Embedded Adobe Story Script Option" may be checked by default. For mixed states in the selection (e.g., where at least one clip has Adobe Story script text embedded, and at least one clip does not), the dialog will open with the "Use Embedded Adobe Story Script Option" checkbox indicating a mixed state and the Reference Script popup menu may be enabled. If the analysis is run in this mixed state, the clip with the Adobe Story script embedded will be analyzed using the Adobe Story script and the clip without the Adobe Story script embedded will be analyzed using the reference script. Selecting the mixed state may generate a check in the "Use Embedded Adobe Story Script Option" checkbox and disable the "Reference Script" menu. If the analysis is run in this state, the result may be the same as above. Selecting the checkbox again may remove the check mark at the "Use Embedded Adobe Story Script Option" checkbox and may re-enable the "Reference Script" menu. If the analysis is run in this state, all clips may use the assigned reference script, and ignore any embedded Story Script text that may be in one or more of the selected clips.

In some embodiments, an STT engine may require that a custom language model include a minimum number of words (e.g., a minimum word count). That is, an STT engine may return an error and/or ignore a custom language model if the model does not include a minimum number of words. For example, if a portion of a script includes only ten words, a corresponding custom language model may include only the ten words. If the STT engine required a minimum of twenty-five words, the STT may not be able to use the custom language model having only ten words. In some embodiments, the words in the custom language model may be duplicated to meet the minimum word count. For example, the ten words may be repeated two additional times in an associated document or file that defines the custom language model to generate a total of thirty words, thereby enabling the resulting custom language model to meet the minimum word requirement of twenty-five words. It is noted that if all of the words are replicated the same number of times, the word frequency table (e.g., how often each of the words in the custom language model is used), and the word tri-graph (e.g., indicative of other words that precede and followed a given word) of the custom language model should remain accurate. That is the frequencies and words that precede or follow a given word remain the same.

Entity Recognition

In some embodiments, it may be desirable to automatically and systematically identifying some or all entities (e.g., dialogue and events) of a script that are of interest to production personnel who work with the script. For example, it may be desirable to identify people, places, and thing/noun entities contained in the script. In the usage chain of video content, such as a movie, users (e.g., marketing personnel, advertisers, and legal personnel) may be interested in identifying and locating when specific people, places, or things occur in the final production video or film to enable, for example, identifying prominent entities that occur in a scene in order to perform contextual advertising (e.g., an advertisement showing a certain type of car ad if the car appears in a crucial segment.) Thus, the processed script, extracted entities, and time-aligned dialogue/entity metadata may enable third-parties applications (e.g., contextual advertisers) to perform high relevancy ad placement.

In some embodiments, a method for identifying and aligning some or all entities within a script includes receiving script data, processing the script data, receiving video content data (e.g., video and audio data), processing the video content data, and synchronizing the script data with the video content data to generate time-aligned script data, and categorizing each regular or proper noun entity within the time-aligned script data. In some embodiments, receiving and processing script data and receiving and processing video content data are performed in series or parallel prior to performing synchronizing the script data with the video content data which is flowed by categorizing each regular or proper noun entity within the time-aligned script data.

Receiving script data may include processes similar to those above described with respect to document extractor 108. For example, receiving script data may include accepting a Hollywood "Spec." Movie Script or dramatic screenplay script document (e.g., document 104), converting this script into specific structured and tagged representation (e.g., document data 110) via systematically extracting and tagging all key script elements (e.g., Scene Headings, Action Descriptions, Dialogue Lines), and then storing these elements as objects in a specialized document object model (DOM) (e.g., a structured/tagged document) for subsequent processing.

Processing the script data may include extracting specific portions of the script. Extracted portions may include noun items. For example, for a given script DOM, processing script data may include processing the objects (e.g., entire sentences tagged by script section) within the script DOM using an NLP engine that identifies, extracts, and tags the noun items identified by the system for each sentence. The extracted and tagged noun elements are then recorded into a specialized metadata database.

Receiving video content data may include processes similar to those described above with respect to audio extractor 112. For example, receiving video content data may include receiving a video or audio file (e.g., video content 112) that contains spoken dialogue that closely but not necessarily exactly corresponds to the dialogue sections of the input script (e.g., document 104). The audio track in the provided video or audio file is then processed using a Speech-to-Text engine (e.g., audio extractor 112) to generate a transcription of the spoken dialogue (e.g., transcript 114). The transcription may include extremely accurate timecode information but potentially higher error rates due to noise and language model artifacts. All spoken words and timecode information of the transcript that indicates at exactly what point in time in the video or audio the words were spoken, is stored.

Synchronizing the script data with the video content data to generate time-aligned script data may include processes similar to those described above with respect to synchronization module 102. For example, synchronizing the script data with the video content data to generate time-aligned script data may include analyzing and synchronizing the structured (but untimed) information in a tagged script document (e.g., document data 110) and the text resulting from the STT transcription stored in metadata repository (e.g., transcript 114) to generate a time-aligned script data (e.g., time aligned script data 116). The time-aligned script data is provided to a named Entity Recognition system to categorize each regular or proper noun entity contained within the time-aligned script data.

Multi-Modal Dataflow

Figure 8A:
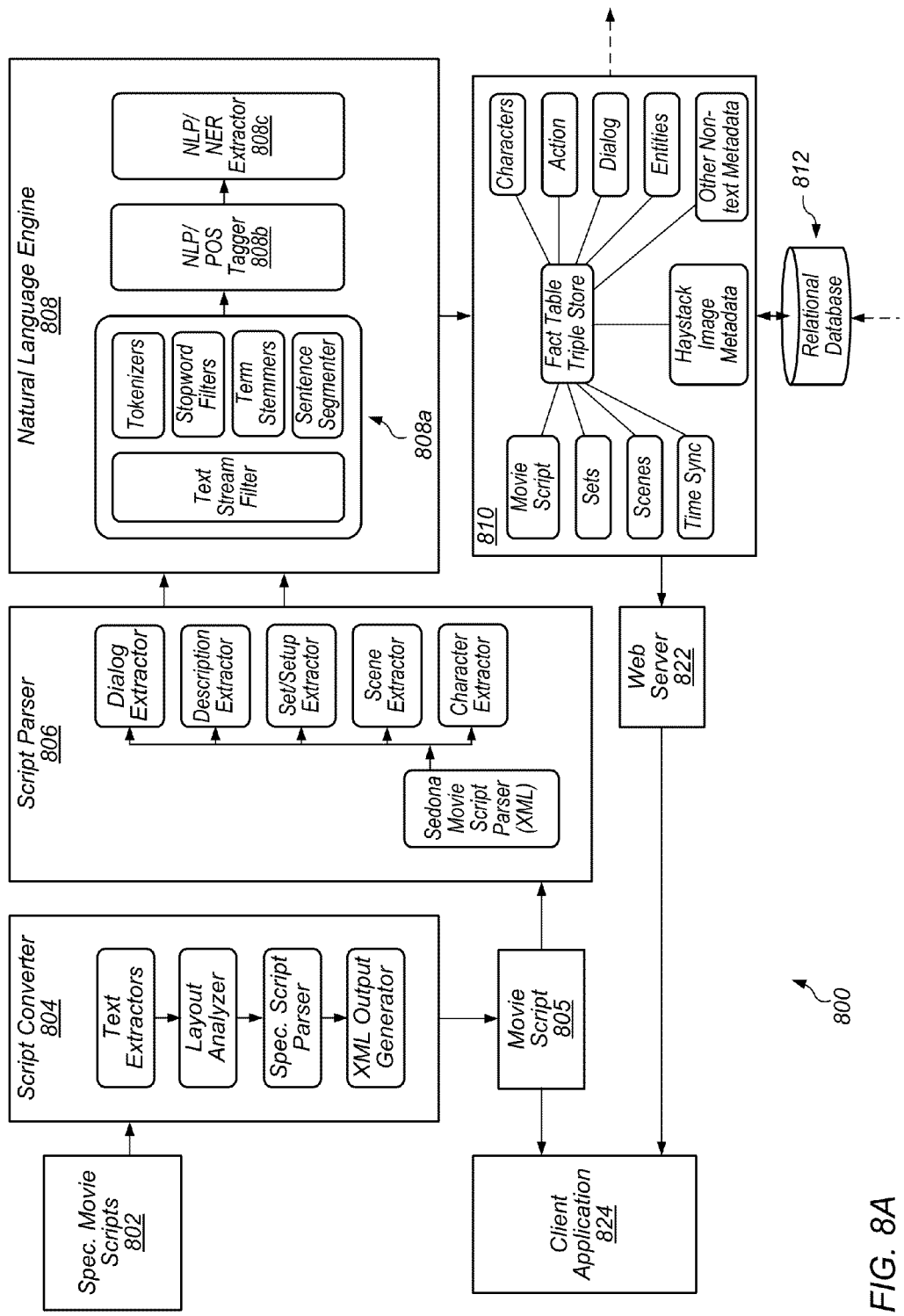
FIGS. 8A and 8B are block diagrams that illustrate components and dataflow of a script time-alignment technique in accordance with one or more embodiments of the present technique.
Figure 8B:
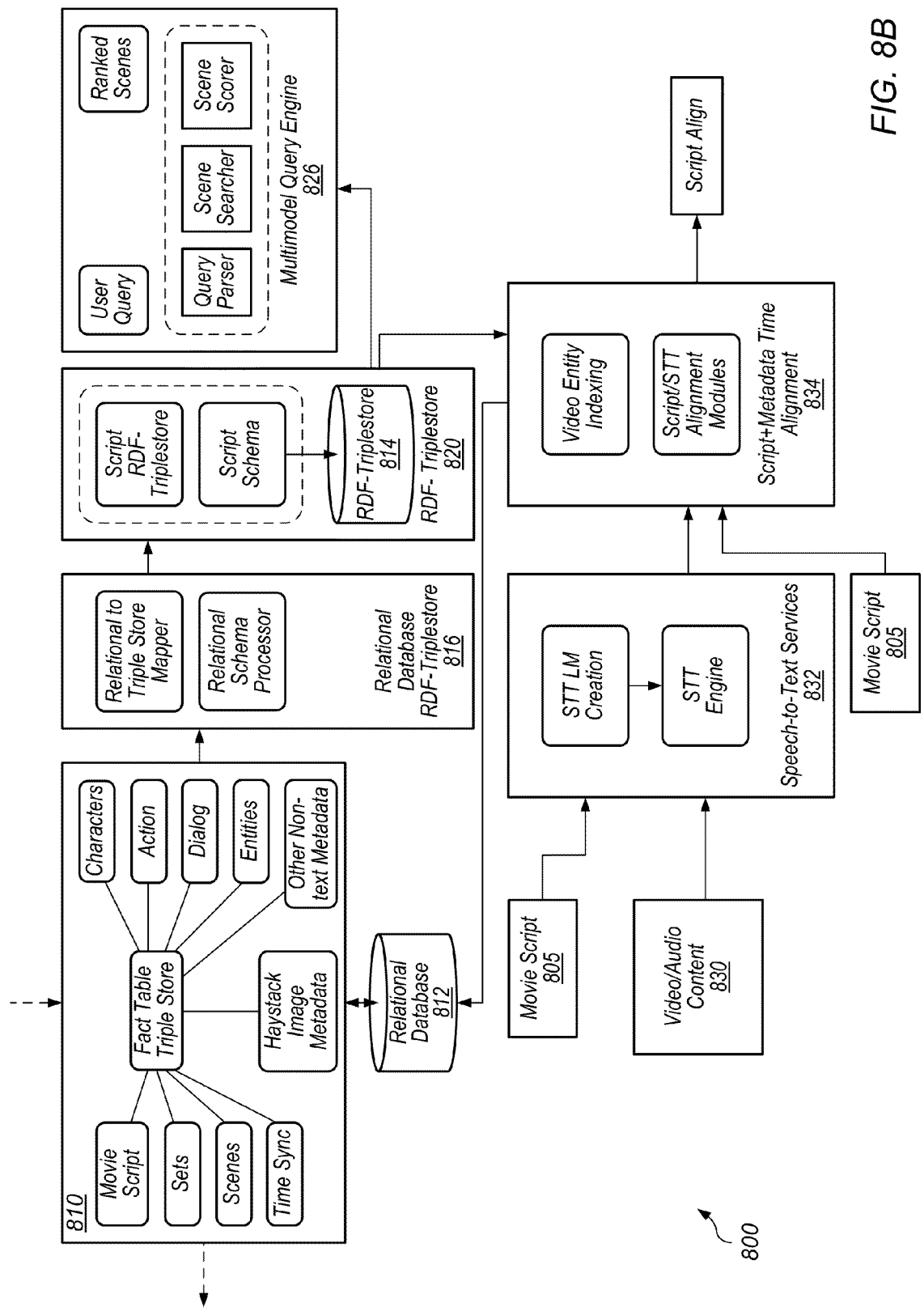

FIGS. 8A and 8B are block diagrams that illustrates components of and dataflow in a document time-alignment technique in accordance with one or more embodiments of the present technique. Note, the dashed lines indicate potential communication paths between various portions of the two block diagrams. System 800 may include features similar to that of previously described system 100.

In some embodiments, script data is provided to system 800. Script document/data 802 may be similar to document 104. For example, movie script documents, closed caption data, and source transcripts are presented as inputs to the system 100. Movie scripts may be represented using a semi-structured Hollywood "Spec." or dramatic screenplay format which provides descriptions of all scene, action, and dialogue events within a movie.

In some embodiments, script data 802 may be provided to a script converter 804. Script converter 804 may be similar to document extractor 108. For example, script elements may be systematically extracted and imported into a standard structured (e.g., XML, ASTX, etc.). Script converter 804 may enable all script elements (e.g., Scenes, Shots, Action, Characters, Dialogue, Parentheticals, and Camera transitions) to be accessible as metadata to applications (e.g., Adobe Story, Adobe OnLocation, and Adobe Premiere Pro) enabling indexing, searching, and organization of video by textual content. Script converter 804 may enable scripts to be captured from a wide variety of sources including: professional screenwriters using word processing or script writing tools, from fan-transcribed scripts of film and television content, and from legacy script archives captured by OCR. Script converter 804 may employ various techniques for extracting and transcribing audio data, such as those described in described in U.S. patent application Ser. No. 12/713,008 entitled "METHOD AND APPARATUS FOR CAPTURING, ANALYZING, AND CONVERTING SCRIPTS", filed Feb. 25, 2010, which is hereby incorporated by reference as though fully set forth herein.

In some embodiments, converted script data 805 (e.g., an ASTX format movie script) from script converter 804 may be provided to a script parser 806. In some embodiments, parser may be implemented as a portion of document extractor 108. Spec. scripts captured and converted into a standard (e.g., Adobe) script format may be parsed by script parser 806 to identify and tag specific script elements such as scenes, actions, camera transitions, dialogue, and parenthetical. The ability to capture, analyze, and generate structured movie scripts may be used in certain time-alignment workflows (e.g., Adobe Pro "Script Align" feature where dialogue text within a movie script is automatically synchronized to the audio dialogue portion of video content).

In some embodiments, parsed script data is processed by a natural language (processing) engine (NLP) 808. In some embodiments, a filter 808a analyzes dialogue and action text from the parsed script data. For example, the input text is normalized and then broken into individual sentences for further processing. Each sentence may form a basic information unit for lines of the script, such as lines of dialogue in the script, or descriptive sentences that describe the setting of a scene or the action within a scene.

In some embodiments, grammatical units of each sentence are tagged at a part-of-speech (POS) tagger 808b. For example, a specialized (POS) tagger 808b is then used to parse, identify, and tag the grammatical units of each sentence with its POS tag (e.g., noun, verb, article, etc.). POS tagger 808b may use a transformational grammar rules technique to first induce and learn a set of lexical and contextual grammar rules from an annotated and tagged reference corpus, and then apply the learned runs for performing the POS tagging step of submitted script sentences.

In some embodiments, tagged verb and noun phrases are submitted to a Named Entity Recognition (NER) system 808c. NER system 808c may then identify and classify entities and actions within each verb or noun phrase. NER 808c may employ one or more external world-knowledge ontologies (API's) to perform the final entity tagging and classification.

In some embodiments, some or all extracted entities from NER system 808c are then represented using a script Entity-Relationship (E-R) data model 810 that includes Scripts, Movie Sets, Scenes, Actions, Transitions, Characters, Parentheticals, Dialogue, and/or Entities. The instantiated model 810 may be physically stored into a relational database 812. In some embodiments, the instantiated model 810 may be mapped into an RDF-Triplestore 814 (see FIG. 8B). In some embodiments, a specialized relational database schema may be provided for certain application (e.g., for Adobe Story). For example, script metadata may be used to record all script metadata and entities and the interrelationships between all entities.

In some embodiments, a relational database to RDF mapping processor 816 may then used automatically processes the relational database schema representation of the E-R model 810 to transfer all script entities in relational database table rows into the RDF-Triplestore 814. Mapping may include RDF mapping system and process techniques, such as those described in described in U.S. patent application Ser. No. 12/507,746 entitled "CONVERSION OF RELATIONAL DATABASES INTO TRIPLESTORES", filed Jul. 22, 2009, which is hereby incorporated by reference as though fully set forth herein.

In some embodiments, E-R model 810 may be saved to relational database 812. Relational database 812 may implement E-R model 810 though a set of specially defined tables and primary key/foreign key referential integrity constraints between tables.

In some embodiments, an RDF-Triplestore 820 may be used to store to the mapped relational database 812 using output of relational database to RDF mapping processor 816. RDF-Triplestore 820 may represent the relational information as a directed acyclic graph and may enable both subgraph and inference chain queries needed by movie or script query applications that retrieve script metadata. Use of RDF-Triplestore 820 may allow video scene entities to be queried using an RDF query language such as SPARQL or a logic programming language, like Prolog. Use of the RDF-Triplestore enables certain kinds of limited machine reasoning and inferences on the script entities (e.g., finding prop objects common to specific movie sets, classifying a scene entity using its IS_A generalization chain for a particular prop, or determining the usage and ownership rights to specific cartoon characters within a movie, for example. Script dialogue data may be stored within RDF-Triplestore 820.

In some embodiments, an application server 822 may be used to process incoming job requests and then communicate RDF-Triplestore data back to one or more client applications 824, such as Adobe Story. Application server 822 may contain a workflow engine along with one or more optional web-servers. Script analysis requests or queries for video and script metadata may be processed by server 822, and then dispatched to a workflow engine which invokes either the NLP analysis engine 808 or a multimodal video query engine 826. Application server 822 may include a Triad/Metasky web server.

In some embodiments, client application 824 may be used to implement further processing. For example, Adobe Story is a product that a client may use to leverage outputs of the workflows described herein to allow script writers to edit and collaborate on movie scripts, to extract, index, and to tag script entities such as people, places, and objects mentioned in the dialogue and action sections of a script. Adobe story may include a script editing service.

The above described steps may describe certain aspects of text processing. The following described steps may describe certain aspects of video and audio processing.

In some embodiments, video/audio content 830 is input and accepted by the workflow system 800. Video/audio content 830 may be similar to that of video content 106. Video/audio content 830 may provide video footage and corresponding dialogue sound tracks. The audio data may be analyzed and transcribed into text using an STT engine, such as those described herein. A resulting generated STT transcript (e.g., similar to transcript 114) may be aligned with converted textual movie scripts 805. In the event scripts are not available for metadata and time-alignment, the STT transcript may be processed by the natural language analysis and entity extraction components for keyword searching of the video. Natural language analysis and entity extraction components for keyword searching of the video may use multimodal video search techniques, such as those described in U.S. patent application Ser. No. 12/618,353 entitled "ACCESSING MEDIA DATA USING METADATA REPOSITORY", filed Nov. 13, 2009, which is hereby incorporated by reference as though fully set forth herein.

In some embodiments, audio content is provided. For example, input audio dialogue tracks may be directly provided by television or movie studios, or extracted from the provided video files using standard known extraction methods. For use with certain application (e.g., Adobe STT CLM and STT multicore application), the extracted audio may be converted to a mono channel format that uses 16-bit samples with a 16 kHz frequency response.

In some embodiments, operation of an STT engine 832 is modified by use of a custom language model (CLM). For example, STT engine 832 may employ transcription based at least partially or completely on a provided CLM. The CLM may be provided/built using certain methods, such as those described herein. In some embodiment, STT engine 832 includes a multicore STT engine. The multicore STT engine may segment the source audio data, may provide STT transcriptions using parallel processing. In some embodiments, speech-to-text (STT) technology may implement a custom language model and/or an enhanced multicore STT transcription engine such as those described in U.S. patent application Ser. No. 12/332,297 entitled "ACCESSING MEDIA DATA USING METADATA REPOSITORY", filed Nov. 13, 2009, and/or U.S. patent application Ser. No. 12/332,309 entitled "MULTI-CORE PROCESSING FOR PARALLEL SPEECH-TO-TEXT PROCESSING", filed Dec. 10, 2008, which are both hereby incorporated by reference as though fully set forth herein.

In some embodiments, a metadata time synchronization service 834 aligns elements of transcript 832 with corresponding portions of script data 802 to generate time-aligned script data. Metadata time synchronization service 834 may be similar to synchronization module 102. For example, in some embodiments, metadata time synchronization service 834 implements a specialized STT/Script alignment component to provide time alignment of non-timecoded words in the script with timecoded words in the STT transcript using a hybrid two-level alignment process, such as that described herein with regard to synchronization module 102. For example, in level one processing, smaller regions or partitions of text and STT transcription keywords are accurately identified and prepared for detailed alignment. In level two processing, known alignment methods based on Viterbi or dynamic programming techniques for edit distance can be used to align the words within each partition. However, in some embodiments, a modified Viterbi method and hybrid phonetic/text comparator may be implemented, as described below. As a result, each script word may be assigned an accurate video timecode. This facilitates keyword search and time-indexing of the video by client applications such as the multimodal video search engine 826, or other applications.

In some embodiments, a modified Viterbi and/or phonetic/text comparator is implemented by metadata time synchronization service 834. Further, the alignment process may also implement special override rules to resolve alignment option ties. As described herein, a decision as to whether or not an alignment is made may not rely only on precise text matches between the transcribed STT word and the script word, but rather, may rely on how closely words sound to each other; this may be provided for using a specialize phonetic encoding of the STT words and script words. Such a technique may be applicable to supplement a wide variety of STT alignment applications.

In some embodiments, data relating to the user is provided a graphical display that presents source script dialogue, the resulting time aligned words, and/or video content in association with one another. For example, a GUI/visualization element of an application (e.g., CS5 Premiere Pro Script Align feature) may enable a user to see source script dialogue words time-aligned with video action.

In some embodiments, a user may search a video based on the corresponding words in the time-aligned script data. For example, a multimodal video search engine may allow a user to search for specific segments of video based on provided query keywords. The search feature may implement various techniques, such as those described in U.S. patent application Ser. No. 12/618,353 entitled "ACCESSING MEDIA DATA USING METADATA REPOSITORY", filed Nov. 13, 2009, which is hereby incorporated by reference as though fully set forth herein.

Video Descriptions

In some embodiments, locations for the insertion of video descriptions can be located, video description content can be extracted from the script and automatically inserted into a time aligned script and/or audio track using time aligned script data (e.g., time aligned script data 116 as described with respect to FIGS. 1 and 2) provided by system 100. Video descriptions may include an audio track in a movie or television program containing descriptions of the setting and action. Video description narrations fill in the story gaps by describing visual elements and provide a more complete description of what's happening in the program. This may be of particular value to the blind or visually impaired by helping to describe visual elements that they cannot view. The video description may be inserted into the natural pauses in dialogue or between critical sound elements, or the video and audio may be modified to enable insertion of video descriptions that may other wise be too long for the natural pauses.

Video description content may be generated by extracting descriptive information and narrative content from a script written for the project, syncing and editing it to the video program for playback. Video description content may be extracted directly from descriptive text embedded in the script. For example, location settings, actor movements, non-verbal events, etc. that may be provided in script elements (e.g., title, author name(s), scene headings, action elements, character names, parentheticals, transitions, shot elements, dialogue/narrations, and the like) may be extracted as the video description content, aligned to the correct portion of scenes (e.g., to pauses in dialogue) using time alignment data, and the video description content may be manually or automatically edited (if needed) to fit into the spaces available between dialogue segments.

In some embodiments, the time aligned data acquired using system 100 may be used to identify the location of pauses within the audio content for embedding narrative content (e.g., action elements). The locations of the pauses in the audio content may be provided to a user as locations for inserting video description content. Thus, a user may be able to quickly identify the location of pauses for adding video description content. In some embodiments, narrative content (e.g., action element descriptions embedded in the script) may be automatically inserted into corresponding pauses within the dialogue of the audio track to provide the corresponding video description content. The resulting video description content may be reviewable and editable by a user. A text version of the video description content can be used as a blueprint for recording by a human voiceover talent. Thus, a voicer may simply have to read the corresponding narration content as opposed to having to manually search through a program, manually identify breaks in the dialog, and derive/record narrations to describe the video. In some embodiments, the video description track can be created automatically using synthesized speech to read the video description content (e.g., without necessarily requiring any or at least a significant amount of human labor).

As noted above, a script may include a variety of script elements such as a scene heading, action, character, parenthetical, dialogue, transition, or other text that cannot be classified. Any or all of these and other script elements can be used to generate useful information for a video description track. A scene heading (also referred to as a "slugline") includes a description of where the scene physically occurs. For example, a scene heading may indicate that the scene takes place indoors (e.g., INT.) or outdoors (e.g., EXT.), or possibly both indoors and outdoors (e.g., INT./EXT.) Typically, a location name follows the description of where the scene physically occurs. For example, "INT./EXT." may be immediately followed by a more detailed description of where the scene occurs. (e.g., INT. KITCHEN, INT. LIVING ROOM, EXT. BASEBALL STADIUM, INT. AIRPLANE, etc.). The scene heading may also include the time of day (e.g., NIGHT, DAY, DAWN, EVENING, etc.). This information embedded in the script helps to "set the scene." The scene type is typically designated as internal (INT.) or external (EXT.), and includes a period following the INT or EXT designation. A hyphen is typically used between other elements of the scene heading. For example, a complete scene heading may read, "INT. FERRY TERMINAL BAR—DAY" or "EXT. MAROON MOVIE STUDIO—DAY".

An action element (also referred to as a description element) typically describes the setting of the scene and introduces the characters in a scene. Action elements may also describe what will actually happen during the scene.

A character name element may include an actual name (e.g., MS. SUTTER), description (e.g., BIG MAN) or occupation (e.g., BARTENDER) of a character. Sequence numbers are typically used to differentiate similar characters (e.g., COP #1 and COP #2). A character name is almost always inserted prior to a character speaking (e.g., just before dialog element), to indicate that the character's dialogue follows.

A dialog element indicates what a character says when anyone on screen or off screen speaks. This may include conversation between characters, when a character speaks out loud to themselves, or when a character is off-screen and only their voice is heard (e.g., in a narration). Dialog elements may also include voice-overs or narration when the speaker is on screen but is not actively speaking on screen.

A parenthetical typically includes a remark that indicates an attitude in dialog delivery, and/or specifies a verbal direction or action direction for the actor who is speaking the part of a character. Parentheticals are typically short, concise and descriptive statements located under the characters name.

A transition typically includes a notation indicating an editing transition within the telling of a story. For example, "DISSOLVE TO:" means the action seems to blur and refocus into another scene, as generally used to denote a passage of time. Transitions almost always follow an action element and precede a scene heading. Common transitions include: "DISSOLVE TO:", "CUT TO:", "SMASH CUT:", "QUICK CUT:", "FADE IN:", "FADE OUT:", and "FADE TO:".

A shot element typically indicates what the camera sees. For example, a shot element that recites "TRACKING SHOT" generally indicates the camera should follow a character as he walks in a scene. "WIDE SHOT" generally indicates that every character appears in the scene. A SHOT tells the reader the focal point within a scene has changed. Example of shot elements include: "ANGLE ON . . . ", "PAN TO . . . ", "EXTREME CLOSE UP . . . ", "FRANKIE'S POV . . . ", and "REVERSE ANGLE . . . ".

In some embodiments, script elements may be identified and extracted as described in U.S. patent application Ser. No. 12/713,008 entitled "METHOD AND APPARATUS FOR CAPTURING, ANALYZING, AND CONVERTING SCRIPTS", filed Feb. 25, 2010, which is hereby incorporated by reference as though fully set forth herein. Moreover, the script elements may be time aligned to provide time-aligned data 116 as described herein. The time aligned data may include dialogue as well as other script elements having corresponding timecodes that identify when each of the respective words/elements occur within the video/audio corresponding to the script.

FIG. 9A illustrates an exemplary script document 900 in accordance with one or more embodiments of the present technique. Script document 900 depicts an exemplary layout of the above described script elements. For example, script document 900 includes a transition element 902, a scene heading element 904, action elements 906a, 906b and 906c, character name elements 908, dialog elements 910, parenthetical elements 912, and shot element 914.

Script writers and describers often have closely aligned goals to describe onscreen actions succinctly, vividly and imaginatively. Often the action element text may be the most useful for creating video description content, as action elements typically provide the descriptions that clearly describe what has happened, is happening, or about to happen in a scene. Typically, long text passages in a script describing major changes in the setting or complex action sequences translate to longer spaces between dialogue in the recorded program (often filled with music and sound effects) and provide opportunities for including longer segments of video description content. For example, in the script 900 of FIG. 9A, the action described under the scene heading 904 and action element 906a is a wide establishing shot that follows the character out onto a busy studio lot. Since it describes a change of scene and establishes the new setting, there is a lot of descriptive text. The director filmed this shot on a crane, which swooped down from a high angle and followed the character through his action in this shot. Since there is a lot of information for the audience to take in during this lengthy transition shot, it begins without dialogue and continues for nearly half a minute. This gap in the dialogue provides a gap in which some or all of the descriptive action element text can be inserted.

Although some elements may be more useful than others, some or all of the script elements may be used to generate video description content. In some embodiments, a user may have control over which script elements to use in creating a video description. For example, a user may select to use only action elements and shot elements and to ignore other elements of the script. In some embodiments, the selection may be done before or after the video description is generated. For example, a user may allow the system to generate a video description using all or some of the script elements, and may subsequently pick-and-choose which elements to keep after the initial video description is generated.

FIG. 9B illustrates an exemplary portion of a video description script 920 that corresponds to the portion of script 900 of FIG. 9A. Video description script 920 includes a video description track 922 broken into discrete segments (1-9) provided relative to gaps and dialogue of an audio track (e.g., main audio program recorded dialogue) 924 that corresponds to spoken words of dialogue content of script 920. In the illustrated embodiment, the content of video description track 922 corresponds to action element text of action elements 906a, 906b and 906c of script 900 of FIG. 9A. Each corresponding pause/gap in dialogue of audio track 922 is identified with a time of duration (e.g., "00:00:28:00 Gap" indicating a gap of twenty-eight seconds prior to the beginning of the script dialogue of segment 2). The corresponding content of video description 922 is provided adjacent the gap/pause, and is identified with a time of duration for the video description content (e.g., "00:00:27:00" indicating twenty-seven seconds for the video description content to be spoken) where applicable. In some embodiments, the content of video description 922 may be modified to fit within the corresponding gap. For example, in the illustrated embodiment, a portion of the first segment of video description content is removed to enable the resulting video description content to fit within the duration of the gap when spoken. In some embodiments, the entire video description content may be deleted or ignored where there is not a gap of sufficient length for the video description content. For example, the video description content of segment 3 was deleted/ignored as the corresponding pause in dialogue was only about twelve frames (or ½ a second) in duration—too short for the insertion of the corresponding video description content. Video description script 920 and video description content 922 can be used as a blueprint for recording by a human voiceover talent. Thus, a voicer may simply have to read the corresponding narration content as opposed to having to manually search through a program, manually identify breaks in the dialog, and derive/record narrations to describe the video. In some embodiments, the video description track can be created automatically using synthesized speech to read the video description content 922 (e.g., without necessarily requiring any or at least a significant amount of human labor).

Figure 9C:
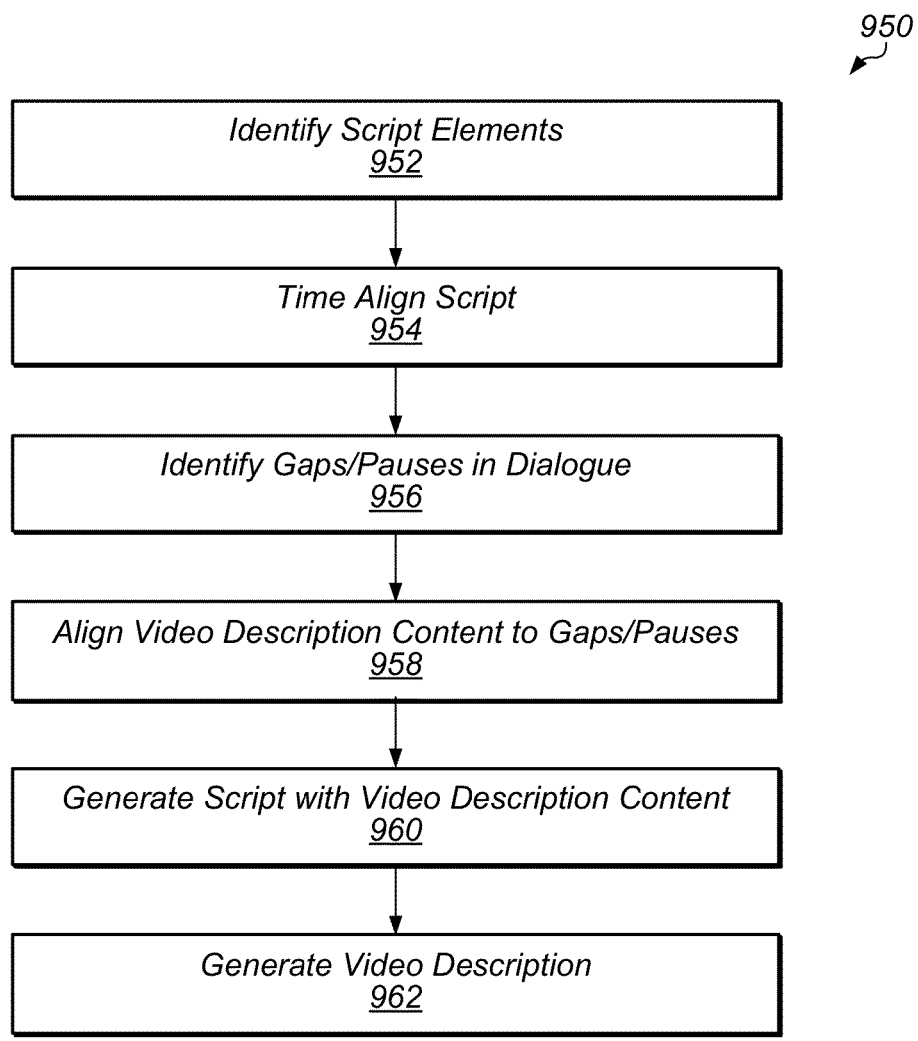
FIG. 9C is a flowchart that illustrates a method of generating a video description in accordance with one or more embodiments of the present technique.

FIG. 9C is a flowchart that illustrates a method 950 of generating a video description in accordance with one or more embodiments of the present technique. Method 950 may provide video description techniques using components and dataflow implemented at system 100. Method 950 generally includes identifying script elements, time aligning the script, identifying gaps/pauses in dialogue, aligning video description content to the gaps/pauses, generating a script with video description content, and generating a video description.

Method 950 may include identifying script elements, as depicted at block 952. Identifying script elements may include identifying some or all of the script elements contained within a script from which a video description is to be generated. For example, a script may be analyzed to provide script metadata that identifies a variety of script elements, such as scene headings, actions, characters, parentheticals, dialogue, transitions, or other text that cannot be classified. In some embodiments, script elements may be identified and extracted as described in U.S. patent application Ser. No. 12/713,008 entitled "METHOD AND APPARATUS FOR CAPTURING, ANALYZING, AND CONVERTING SCRIPTS", filed Feb. 25, 2010, which is hereby incorporated by reference as though fully set forth herein. In some embodiments, the identification of the elements may not actually be performed but may simply be provided or retrieved for analysis.

Method 950 may also include time aligning the script, as depicted at block 954. Time aligning the script may include using techniques, such as those described herein with regard to system 100, to provide a timecode for some or all elements of the corresponding script. For example, a script may be processed to provide a timecode for some or all of the words within the script, including dialogue or other script elements. In some embodiments, the timecode information may provide stop and start time for various elements, including dialogue, which enables the identification of pauses between spoken words of dialogue. In some embodiments, the time alignment may not actually be performed but may simply be provided. For example, a system generating a video description may be provided or retrieve time aligned script data 116.

Method 950 may also include identifying gaps/pauses in dialogue, as depicted at block 956. In some embodiments, identifying gaps/pauses in dialogue may include assessing timecode information for each word of spoken dialogue to identify the beginning and end of spoken lines of dialogue, as well as any pauses in the spoken lines of dialogue that may provide gaps for the insertion of video description content. For example, in video description script 920 of FIG. 9B, a pause of twenty-eight seconds was identified at segment 1, prior to the start of recorded dialogue of segment 2, a pause of 0.12 seconds was identified at segment 3, and a pause of 4.06 seconds was identified at segment 7. In some embodiments, a gap threshold may be used to identify what pauses are of sufficient length to constitute a gap that may be of sufficient length to be used for inserting video description content. For example, a gap threshold of three seconds may be set, thereby ignoring all pauses of less than three seconds and identifying only pauses equal to or greater than three-seconds as gaps of sufficient length to be used for inserting video description content. Such a technique may be useful to ignore normal pauses in speech (e.g., between spoken words) or short breaks between characters lines of dialogue that may be so short that it would be difficult to provide any substantive video description within the pause. In some embodiments, the gap threshold value may be user selectable. As depicted in FIG. 9B, the user may be provided with an indication that a gap is too short where there is a corresponding script element. For example, segment 3 of recorded dialogue 924 includes an inserted statement of "No gap available", and the corresponding action text was deleted/ignored (as indicated by the strikethrough). Moreover, where there is no video description content (e.g., script elements) corresponding to a gap, the gap may be detected, but may be ignored. In some embodiments, the user may be alerted to the gap, thereby enabling them to readily identify gaps that could be used for the insertion of additional video description content. In some embodiments, video descriptions may be inserted into any available gaps, even out of sequence with their corresponding location in the script, according to rules or preferences provided by the user. For example, in segment 3, there was no available gap for the video description that would normally be inserted at that point according to the script. However, if there were another available gap within a prescribed number of seconds before or after that segment (e.g., segment 3), the video description could be inserted at that other location nearby within the prescribed number of seconds before or after that segment (e.g., segment 3).

Method 950 may also include aligning video description content to gaps/pauses, as depicted at block 958. Aligning the video description content may include aligning the script elements with dialogue relative to where they occur within the script. In FIG. 9B, each of the action elements 906a, 906b and 906c are aligned relative to dialogue that occurs before or after the respective action elements. In some embodiments, aligning video description content includes modifying the video description content and/or the recorded dialogue for merging of the video description content with the recorded dialogue where possible. For example, as depicted in FIG. 9B the script action elements have been aligned to the recorded dialog and the action element text from the script has been aligned with the available gaps when possible. Two gaps were identified at segments 1 and 7 for the insertion of corresponding video description content and one action element text segment was deleted because a gap/pause of sufficient length was not available between the lines of dialogue where it was located in the script. In some embodiments, where video description content cannot be fit within a corresponding gap/pause, the user may be provided the opportunity to edit, rewrite, move, or delete the video description content, or the video description content may be automatically modified to fit within the provided gap or deleted.

In some embodiments, a user may have control over the resulting video description. For example, a user may modify a video description at their choosing, or may be provided an opportunity to select how to truncate a video description that does not fit within a gap. For example, in the illustrated embodiment of FIG. 9B, a user may select to remove the text of segment 1 (as indicated by the strikethrough) in an effort to make the video description fit within the corresponding gap. In some embodiments, video description content may be automatically modified to fit within a given gap. If a gap is too short to fit the corresponding video description content, the video description content may be automatically truncated using rules of grammar. For example, the last word(s) or entire last sentence(s) may be incrementally truncated/removed until the remaining video content description is short enough to fit within the gap. In the illustrated embodiment of FIG. 9B, the last sentence "Maroon is leading an entourage of ASSISTANTS trying to keep up" may have been automatically removed, relieving the user of the need to manually modify the content. Of course, even in the event of automatic modification of the video description content, the user may have the opportunity to approve or modify the changes. In some embodiments, as the video description content is edited, the duration may be updated dynamically to indicate to the user whether the revised description will fit within an available gap.

In some embodiments, a gap in the recorded program may be created or the duration of a gap may be modified to provide for the insertion of video description content. For example, at segment 3, the gap in the recorded audio may be increased (e.g., by inserting an additional amount of pause in the audio track between the end of segment 2 and the beginning of segment 4) to five seconds to enable the action element text to be fit within the resulting gap. Such a technique may be automatically applied at some or all instances where a gap is too short in duration to fit the corresponding video description content. Although such modifications of the dialogue may introduce delays or pauses within the corresponding video and, thus, may modify the video and dialogue of a traditional program, it may be particularly helpful in the context of audio-only programs. For example, for books-on-tape or similar audio tracks produced for the blind or visually impaired.

In some embodiments, video description content may be allowed to overlap certain portions of the audio track. For example, a user may have the option of modifying the video description content to overlap seemingly less important portions of the dialogue, music, sound effects, or the like. In some embodiments, the main audio recorded dialogue, music, sound effects, or the like may be dipped (e.g., reduced) in volume so that the video description may be heard more clearly. For example, the volume of music may be lowered while the video description content is being recited.

Method 950 may also include generating a script with video description content, as depicted at block 960. Generating a script with video content may include generating a script document that includes video description content; script/recorded dialogue, and/or other script elements aligned with respect to one another. FIG. 9B illustrates an exemplary video description script 920 that includes video description content 922 and recorded dialogue 924. In the illustrated embodiment, the modifications to the video description content are displayed. In some embodiments, a "clean" version of the video description script may be provided. For example, clean video description script may incorporate some or all of the modifications that are not visible. A text version of the video description content can be used as a blueprint for recording by a human voiceover talent. Thus, a voicer may simply have to read the corresponding narration content as opposed to having to manually search through a program, manually identify breaks in the dialog, compose appropriate video descriptions of correct lengths, and/or derive/record narrations to describe the program.

Method 950 may also include generating a video description, as depicted at block 962. Generating the video description may include recording a reading of the video description content. For example, a reading by a voicer and/or a synthesized reading of the video description content may be recorded to generate a video description track. In some embodiments, the video description track may be merged with the original audio of the program to generate a program containing both the original audio and the video description audio.

Computer System

Figure 10:
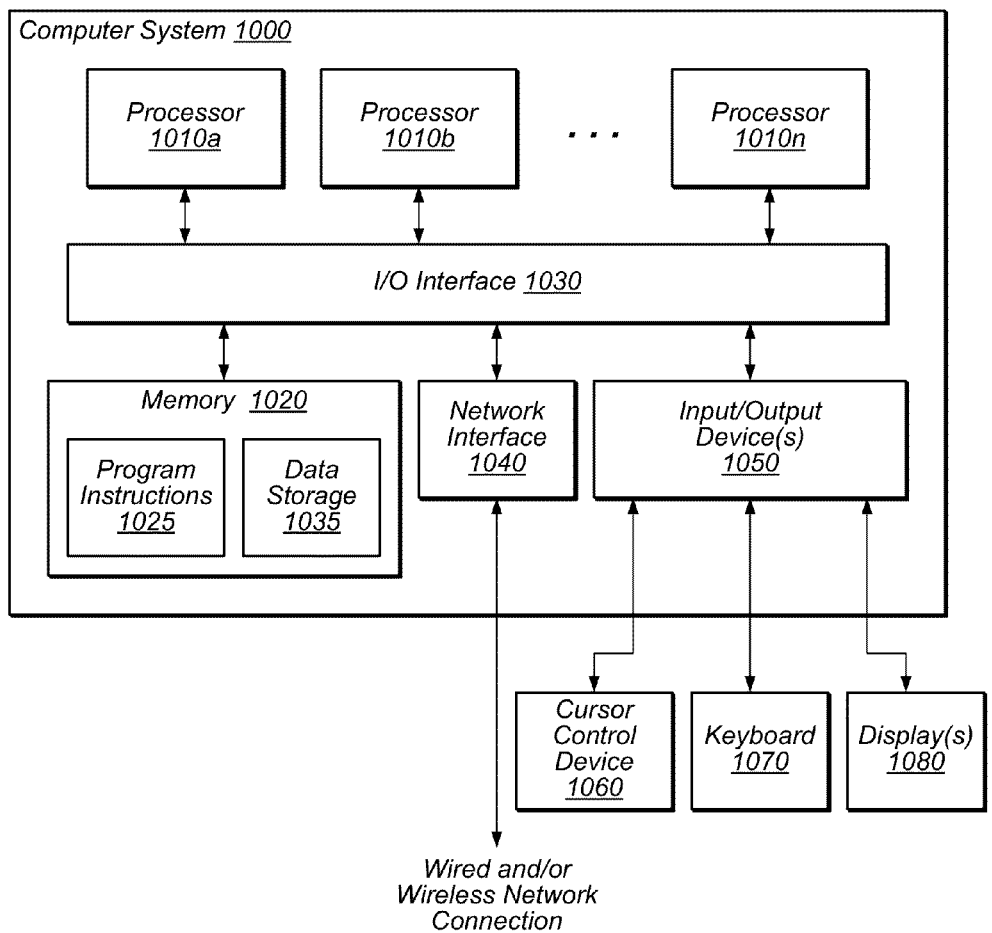
FIG. 10 is a block diagram that illustrates an example computer system in accordance with one or more embodiments of the present technique.

Various components of embodiments of a document time-alignment technique as described herein may be executed on one or more computer systems, which may interact with various other devices. One such computer system is illustrated by FIG. 10. In the illustrated embodiment, computer system 1000 includes one or more processors 1010 coupled to a system memory 1020 via an input/output (I/O) interface 1030. Computer system 1000 further includes a network interface 1040 coupled to I/O interface 1030, and one or more input/output devices 1050, such as cursor control device 1060, keyboard 1070, audio device 1090, and display(s) 1080. In some embodiments, it is contemplated that embodiments may be implemented using a single instance of computer system 1000, while in other embodiments multiple such systems, or multiple nodes making up computer system 1000, may be configured to host different portions or instances of embodiments. For example, in one embodiment some elements may be implemented via one or more nodes of computer system 1000 that are distinct from those nodes implementing other elements.

In various embodiments, computer system 1000 may be a uniprocessor system including one processor 1010, or a multiprocessor system including several processors 1010 (e.g., two, four, eight, or another suitable number). Processors 1010 may be any suitable processor capable of executing instructions. For example, in various embodiments, processors 1010 may be general-purpose or embedded processors implementing any of a variety of instruction set architectures (ISAs), such as the x86, PowerPC, SPARC, or MIPS ISAs, or any other suitable ISA. In multiprocessor systems, each of processors 1010 may commonly, but not necessarily, implement the same ISA.

In some embodiments, at least one processor 1010 may be a graphics processing unit. A graphics processing unit or GPU may be considered a dedicated graphics-rendering device for a personal computer, workstation, game console or other computer system. Modern GPUs may be very efficient at manipulating and displaying computer graphics and their highly parallel structure may make them more effective than typical CPUs for a range of complex graphical algorithms. For example, a graphics processor may implement a number of graphics primitive operations in a way that makes executing them much faster than drawing directly to the screen with a host central processing unit (CPU). In various embodiments, the methods disclosed herein for layout-preserved text generation may be implemented by program instructions configured for execution on one of, or parallel execution on two or more of, such GPUs. The GPU(s) may implement one or more application programmer interfaces (APIs) that permit programmers to invoke the functionality of the GPU(s). Suitable GPUs may be commercially available from vendors such as NVIDIA Corporation having headquarters in Santa Clara, Calif., ATI Technologies of AMD having headquarters in Sunnyvale, Calif., and others.

System memory 1020 may be configured to store program instructions and/or data accessible by processor 1010. System memory 1020 may include tangible a non-transitory storage medium for storing program instructions and other data thereon. In various embodiments, system memory 1020 may be implemented using any suitable memory technology, such as static random access memory (SRAM), synchronous dynamic RAM (SDRAM), nonvolatile/Flash-type memory, or any other type of memory. In the illustrated embodiment, program instructions and data implementing desired functions, such as those described above for time-alignment methods, are shown stored within system memory 1020 as program instructions 1025 and data storage 1035, respectively. In other embodiments, program instructions and/or data may be received, sent or stored upon different types of computer-accessible media or on similar media separate from system memory 1020 or computer system 1000. Generally speaking, a computer-accessible medium may include storage media or memory media such as magnetic or optical media, e.g., disk or CD/DVD-ROM coupled to computer system 1000 via I/O interface 1030. Program instructions and data stored via a computer-accessible medium may be transmitted by transmission media or signals such as electrical, electromagnetic, or digital signals, which may be conveyed via a communication medium such as a network and/or a wireless link, such as may be implemented via network interface 1040.

In one embodiment, I/O interface 1030 may be configured to coordinate I/O traffic between processor 1010, system memory 1020, and any peripheral devices in the device, including network interface 1040 or other peripheral interfaces, such as input/output devices 1050. In some embodiments, I/O interface 1030 may perform any necessary protocol, timing or other data transformations to convert data signals from one component (e.g., system memory 1020) into a format suitable for use by another component (e.g., processor 1010). In some embodiments, I/O interface 1030 may include support for devices attached through various types of peripheral buses, such as a variant of the Peripheral Component Interconnect (PCI) bus standard or the Universal Serial Bus (USB) standard, for example. In some embodiments, the function of I/O interface 1030 may be split into two or more separate components. In addition, in some embodiments some or all of the functionality of I/O interface 1030, such as an interface to system memory 1020, may be incorporated directly into processor 1010.

Network interface 1040 may be configured to allow data to be exchanged between computer system 1000 and other devices attached to a network, such as other computer systems, or between nodes of computer system 1000. In various embodiments, network interface 1040 may support communication via wired or wireless general data networks, such as any suitable type of Ethernet network, for example; via telecommunications/telephony networks such as analog voice networks or digital fiber communications networks; via storage area networks such as Fibre Channel SANs, or via any other suitable type of network and/or protocol.

Input/output devices 1050 may, in some embodiments, include one or more display terminals, keyboards, keypads, touchpads, scanning devices, voice or optical recognition devices, or any other devices suitable for entering or retrieving data by one or more computer system 1000. Multiple input/output devices 1050 may be present in computer system 1000 or may be distributed on various nodes of computer system 1000. In some embodiments, similar input/output devices may be separate from computer system 1000 and may interact with one or more nodes of computer system 1000 through a wired or wireless connection, such as over network interface 1040.

As shown in FIG. 10, memory 1020 may include program instructions 1025, configured to implement embodiments of a layout-preserved text generation method as described herein, and data storage 1035, comprising various data accessible by program instructions 1025. In one embodiment, program instructions 1025 may include software elements of a layout-preserved text generation method illustrated in the above Figures.

Data storage 1035 may include data that may be used in embodiments, for example input PDF documents or output layout-preserved text documents. In other embodiments, other or different software elements and/or data may be included.

Those skilled in the art will appreciate that computer system 1000 is merely illustrative and is not intended to limit the scope of a layout-preserved text generation method as described herein. In particular, the computer system and devices may include any combination of hardware or software that can perform the indicated functions, including computers, network devices, internet appliances, PDAs, wireless phones, pagers, etc. Computer system 1000 may also be connected to other devices that are not illustrated, or instead may operate as a stand-alone system. In addition, the functionality provided by the illustrated components may in some embodiments be combined in fewer components or distributed in additional components. Similarly, in some embodiments, the functionality of some of the illustrated components may not be provided and/or other additional functionality may be available.

Those skilled in the art will also appreciate that, while various items are illustrated as being stored in memory or on storage while being used, these items or portions of them may be transferred between memory and other storage devices for purposes of memory management and data integrity. Alternatively, in other embodiments some or all of the software components may execute in memory on another device and communicate with the illustrated computer system via inter-computer communication. Some or all of the system components or data structures may also be stored (e.g., as instructions or structured data) on a computer-accessible medium or a portable article to be read by an appropriate drive, various examples of which are described above. In some embodiments, instructions stored on a computer-accessible medium separate from computer system 1000 may be transmitted to computer system 1000 via transmission media or signals such as electrical, electromagnetic, or digital signals, conveyed via a communication medium such as a network and/or a wireless link. Various embodiments may further include receiving, sending or storing instructions and/or data implemented in accordance with the foregoing description upon a computer-accessible medium. Accordingly, the present invention may be practiced with other computer system configurations. In some embodiments, portions of the techniques described herein (e.g., preprocessing of script and metadata may be hosted in a cloud computing infrastructure.

Various embodiments may further include receiving, sending or storing instructions and/or data implemented in accordance with the foregoing description upon a computer-accessible medium. Generally speaking, a computer-accessible storage medium may include a non-transitory storage media or memory media such as magnetic or optical media, e.g., disk or DVD/CD-ROM, volatile or non-volatile media such as RAM (e.g. SDRAM, DDR, RDRAM, SRAM, etc.), ROM, etc., as well as transmission media or signals such as electrical, electromagnetic, or digital signals, conveyed via a communication medium such as network and/or a wireless link.

Some portions of the detailed description provided herein are presented in terms of algorithms or symbolic representations of operations on binary digital signals stored within a memory of a specific apparatus or special purpose computing device or platform. In the context of this particular specification, the term specific apparatus or the like includes a general purpose computer once it is programmed to perform particular functions pursuant to instructions from program software. Algorithmic descriptions or symbolic representations are examples of techniques used by those of ordinary skill in the signal processing or related arts to convey the substance of their work to others skilled in the art. An algorithm is here, and is generally, considered to be a self-consistent sequence of operations or similar signal processing leading to a desired result. In this context, operations or processing involve physical manipulation of physical quantities. Typically, although not necessarily, such quantities may take the form of electrical or magnetic signals capable of being stored, transferred, combined, compared or otherwise manipulated. It has proven convenient at times, principally for reasons of common usage, to refer to such signals as bits, data, values, elements, symbols, characters, terms, numbers, numerals or the like. It should be understood, however, that all of these or similar terms are to be associated with appropriate physical quantities and are merely convenient labels. Unless specifically stated otherwise, as apparent from the discussion, it is appreciated that throughout this specification discussions utilizing terms such as "processing," "computing," "calculating," "determining" or the like refer to actions or processes of a specific apparatus, such as a special purpose computer or a similar special purpose electronic computing device. In the context of this specification, therefore, a special purpose computer or a similar special purpose electronic computing device is capable of manipulating or transforming signals, typically represented as physical electronic or magnetic quantities within memories, registers, or other information storage devices, transmission devices, or display devices of the special purpose computer or similar special purpose electronic computing device.

Various methods as illustrated in the Figures and described herein represent examples of embodiments of methods. The methods may be implemented in software, hardware, or a combination thereof. The order of method may be changed, and various elements may be added, reordered, combined, omitted, modified, etc.

Various modifications and changes may be to the above technique made as would be obvious to a person skilled in the art having the benefit of this disclosure. For example, although several embodiments are discussed with regard to dialogue/narrative elements of script documents, the techniques described herein may be applied to assess and determine data relating other elements of a script document. It is intended that the invention embrace all such modifications and changes and, accordingly, the above description to be regarded in an illustrative rather than a restrictive sense.

Adobe and Adobe PDF are either registered trademarks or trademarks of Adobe Systems Incorporated in the United States and other countries.

What is claimed is:

1. A computer-implemented method, comprising:
generating a sequential alignment of script words from script data to dialogue words from audio data, the audio data including timecodes associated with the dialogue words;
matching at least some sequences of the script words to corresponding sequences of the dialogue words to determine hard alignment points;
partitioning the sequential alignment of the script words into alignment sub-matrices, the bounds of the alignment sub-matrices being defined by adjacent hard alignment points, and the alignment sub-matrices comprising a sub-set of the script words and a corresponding sub-set of the dialogue words that occur between the hard alignment points;
removing symbols and punctuation from the sub-set of script words in the alignment sub-matrices;
aligning the sub-set of script words in each alignment sub-matrix of the alignment sub-matrices with a corresponding sub-set of dialogue words in each alignment sub-matrix of the alignment sub-matrices to determine a best fit alignment, comprising:
filtering the sub-set of dialogue words to heuristically remove stop words:
matching the sub-set of the script words and the corresponding sub-set of the dialogue words based on phonetic matching;
using a word edit distance algorithm to match the script words in each alignment sub-matrix of the alignment sub-matrices with the corresponding sub-set of the dialogue words in each alignment sub-matrix of the alignment sub-matrices to determine soft alignment points;
determining timecodes for the hard and soft alignment points;
interpolating, based on the timecodes associated with at least some matched dialogue words, to determine timecodes for one or more unmatched script words; and
generating time-aligned script data comprising the sub-set of the script words and their determined timecodes.

2. The method of claim 1, further comprising providing video content data corresponding to the script data, wherein the video content data comprises the audio data corresponding to at least a portion of the dialogue words.

3. The method of claim 1, wherein the sequential alignment comprises a matrix of the script words versus the dialogue words.

4. The method of claim 1, further comprising iteratively increasing the length of the sequences of the script words that correspond to the sequences of the dialogue words to improve said matching.

5. The method of claim 1, wherein the best fit alignment is the alignment with the lowest indication of possible error.

6. The method of claim 1, wherein the interpolating comprises at least one of linear interpolation or non-linear interpolation.

7. The method of claim 1, further comprising:
receiving the script data comprising the script words; and
receiving audio data corresponding to at least a portion of the dialogue words.

8. One or more computer-readable storage media devices having stored thereon multiple instructions executable by one or more processors to perform operations comprising:
generating a sequential alignment of script words from script data to dialogue words from audio data, the audio data including timecodes associated with the dialogue words;
matching at least some sequences of the script words to corresponding sequences of the dialogue words to determine hard alignment points;
partitioning the sequential alignment of the script words into alignment sub-matrices, the bounds of the alignment sub-matrices being defined by adjacent hard alignment points, and the alignment sub-matrices comprising a sub-set of the script words and a corresponding sub-set of the dialogue words that occur between the hard alignment points;
removing symbols and punctuation from the sub-set of script words in the alignment sub-matrices;
aligning the sub-set of script words in each alignment sub-matrix of the alignment sub-matrices with a corresponding sub-set of dialogue words in each alignment sub-matrix of the alignment sub-matrices to determine a best fit alignment, comprising:
filtering the sub-set of dialogue words to heuristically remove stop words;
matching the sub-set of the script words and the corresponding sub-set of the dialogue words based on phonetic matching;
using a word edit distance algorithm to match the script words in each alignment sub-matrix of the alignment sub-matrices with the corresponding sub-set of the dialogue words in each alignment sub-matrix of the alignment sub-matrices to determine soft alignment points;
determine timecodes for the hard and soft alignment points;
interpolating, based on the timecodes associated with at least some matched dialogue words, to determine timecodes for one or more unmatched script words; and
generating time-aligned script data comprising the sub-set of the script words and their determined timecodes.

9. The one or more computer-readable storage media devices of claim 8, wherein the instructions are executable to perform operations further comprising providing video content data corresponding to the script data, and wherein the video content data comprises the audio data corresponding to at least a portion of the dialogue words.

10. The one or more computer-readable storage media devices of claim 8, wherein the sequential alignment comprises a matrix of the script words versus the dialogue words.

11. The one or more computer-readable storage media devices of claim 8, wherein the instructions are further executable to perform operations further comprising iteratively increasing the length of the sequences of the script words that correspond to the sequences of the dialog words to improve said match.

12. The one or more computer-readable storage media devices of claim 8, wherein the best fit alignment is the alignment with the lowest indication of possible error.

13. The one or more computer-readable storage media devices of claim 8, wherein the interpolation comprises at least one of linear interpolation or non-linear interpolation.

14. The one or more computer-readable storage media devices of claim 8, wherein the instructions are executable to perform operations further comprising:
receiving the script data comprising the script words; and
receiving audio data corresponding to at least a portion of the dialogue words.

15. A system comprising:
one or more processors; and
memory, coupled to the one or more processors, the memory comprising instructions executable by the one or more processors to perform operations including:
generating a sequential alignment of script words from script data to the dialogue words from audio data, the audio data including timecodes associated with the dialogue words;
matching at least some sequences of the script words to corresponding sequences of the dialogue words to determine hard alignment points;
partitioning the sequential alignment of the script words into alignment sub-matrices, the bounds of the alignment sub-matrices being defined by adjacent hard alignment points, and the alignment sub-matrices comprising a sub-set of the script words and a corresponding sub-set of the dialogue words that occur between the hard alignment points;
removing symbols and punctuation from the sub-set of script words in the alignment sub-matrices;
aligning the sub-set of script words in each alignment sub-matrix of the alignment sub-matrices with a corresponding sub-set of dialogue words in each alignment sub-matrix of the alignment sub-matrices to determine a best fit alignment, comprising:
filtering the sub-set of dialogue words to heuristically remove stop words;
matching the sub-set of the script words and the corresponding sub-set of the dialogue words based on phonetic matching;
using a word edit distance algorithm to match the script words in each alignment sub-matrix of the alignment sub-matrices with the corresponding sub-set of the dialogue words in each alignment sub-matrix of the alignment sub-matrices to determine soft alignment points;
determining timecodes for the hard and soft alignment points;
interpolatinge, based on the timecodes associated with at least some matched dialogue words, to determine timecodes for one or more unmatched script words; and
generating time-aligned script data comprising the sub-set of script words and their determined timecodes.

16. The system of claim 15, wherein the system is configured to receive video content data corresponding to the script data, wherein the video content data comprises the audio data corresponding to at least a portion of the dialogue words.

17. The system of claim 15, wherein the sequential alignment comprises a matrix of the script words versus the dialogue words.

18. The system of claim 15, wherein the instructions are executable to perform operations further including iteratively increasing the length of the sequences of the script words that correspond to the sequences of the dialog words to improve said match.

19. The system of claim 15, wherein the best fit alignment is the alignment with the lowest indication of possible error.

20. The system of claim 15, wherein the interpolation comprises at least one of linear interpolation or non-linear interpolation.

21. The system of claim 15, wherein the instructions are executable to perform operations further including:
- receiving the script data comprising the script words; and
- receiving audio data corresponding to at least a portion of the dialogue words.

\* \* \* \* \*

UNITED STATES PATENT AND TRADEMARK OFFICE
CERTIFICATE OF CORRECTION

PATENT NO. : 8,825,488 B2  
APPLICATION NO. : 12/789720  
DATED : September 2, 2014  
INVENTOR(S) : Scoggins et al.

Page 1 of 1

It is certified that error appears in the above-identified patent and that said Letters Patent is hereby corrected as shown below:

In the Claims

Column 52, line 46, delete "interpolatinge", insert -- interpolating --, therefor.

Signed and Sealed this  
Sixteenth Day of December, 2014

Michelle K. Lee  
*Deputy Director of the United States Patent and Trademark Office*